United States Patent
Russo et al.

(10) Patent No.: US 12,529,705 B2
(45) Date of Patent: Jan. 20, 2026

(54) METHOD FOR DETECTING THE PRESENCE AND QUANTITY OF THE LRP8 RECEPTOR AND OF ITS PROTEOLYTIC FRAGMENTS, DETECTION KIT AND RELATED ANTIBODIES

(71) Applicant: Claudio Russo, Ferrazzano (IT)

(72) Inventors: Claudio Russo, Ferrazzano (IT); Aldo Pagano, Santa Margherita Ligure (IT); Alessandro Medoro, Campobasso (IT); Donatella Mignogna, Campobasso (IT); Carola Porcile, Ferrazzano (IT); Silvia Bartollino, Campobasso (IT); Roberto Maria Antonio Di Marco, Campobasso (IT); Gennaro Raimo, Campobasso (IT); Mariano Intrieri, Campobasso (IT); Germano Guerra, Campobasso (IT); Esther Imperlini, Campobasso (IT); Emanuele Fodera', Campobasso (IT); Tullio Florio, Genoa (IT)

(73) Assignee: Russo Claudio, Campobasso (IT)

( * ) Notice: Subject to any disclaimer, the term of this patent is extended or adjusted under 35 U.S.C. 154(b) by 1203 days.

(21) Appl. No.: 17/418,884

(22) PCT Filed: Dec. 23, 2019

(86) PCT No.: PCT/IB2019/061268
§ 371 (c)(1),
(2) Date: Jun. 28, 2021

(87) PCT Pub. No.: WO2020/136546
PCT Pub. Date: Jul. 2, 2020

(65) Prior Publication Data
US 2022/0074957 A1    Mar. 10, 2022

(30) Foreign Application Priority Data
Dec. 27, 2018   (IT) .................. 102018000021157

(51) Int. Cl.
*G01N 33/92*       (2006.01)
(52) U.S. Cl.
CPC .................. *G01N 33/92* (2013.01)
(58) Field of Classification Search
CPC .................................... G01N 33/92
See application file for complete search history.

(56) References Cited

U.S. PATENT DOCUMENTS

2010/0298200 A1   11/2010   Liu et al.

OTHER PUBLICATIONS

Larios JA, Jausoro I, Benitez ML, Bronfman FC, Marzolo MP. Neurotrophins regulate ApoER2 proteolysis through activation of the Trk signaling pathway. BMC Neurosci. Sep. 1, 20149; 15:108. (Year: 2014).*
Anti-ApoER2 antibody produced in rabbit. Product Information [online]. Millipore Sigma (R), unknown year [retrieved on Sep. 26, 2024]. Retrieved from the Internet: <URL:https://www.sigmaaldrich.com/US/en/product/sigma/a3481> (Year: 2024).*
U.S. Appl. No. 14/428,050, filed Mar. 27, 2014, Tamburini Paul.*
Jorge A Larios et al., "Neurotrophins regulate ApoER2 proteolysis through activation of the Trk signaling pathway" BMC Neuroscience, vol. 15, No. 108, pp. 1-17, 2014.
Hyang-Sook Hoe et al., "Effects of apoE on neuronal signaling and APP processing in rodent brain" Brain Research, Elsevier, vol. 1112, No. 1, pp. 70-79, 2006.
Uwe Beffert et al., "ApoE Receptor 2 Controls Neuronal Survival in the Adult Brain" Current Biology, vol. 16, No. 24, pp. 2446-2452, 2006.
M.W. Pitts et al., "Deletion of Selenoprotein P Results in Impaired Function of Parvalbumin Interneurons and Alterations in Fear Learning and Sensorimotor Gating" Neuroscience, vol. 208, pp. 58-68, 2012.
Aitana Sogorb-Esteve et al., "Inhibition of y-Secretase Leads to an Increase in Presenilin-1" Mol Neurobiol, vol. 55, No. 6, 2017.
Mar. 17, 2020 International Search Report issued in International Patent Application No. PCT/IB2019/061268.
Mar. 17, 2020 Written Opinion issued in International Patent Application No. PCT/IB2019/061268.

* cited by examiner

*Primary Examiner* — Jeffrey Stucker
(74) *Attorney, Agent, or Firm* — Oliff PLC

(57) ABSTRACT

A method for detecting the presence and quantity of some substrates of γ-secretase and of fragments thereof using antibodies, obtained both by the action of γ-secretase or of other proteases, in biological samples isolated from the human body. A kit for the detection of substrates of γ-secretase and fragments, as well as their antibodies to be used in the method and in the kit for the diagnosis of diseases, such as Alzheimer's, Down syndrome and cancers. The antibodies are produced against specific C-terminal sequences of the protein LRP8 and its fragments.

3 Claims, 6 Drawing Sheets

Specification includes a Sequence Listing.

SEQ ID NO: 14

```
         10          20          30          40          50
MGLPEPGPLR LLALLLLLLL LLLLQLQHLA AAAADPLLGG QGPAKDCEKD
         60          70          80          90         100
QFQCRNERCI PSVWRCDEDD DCLDHSDEDD CPKKTCADSD FTCDNGHCIH
        110         120         130         140         150
ERWKCDGEEE CPDGSDESEA TCTKQVCPAE KLSCGPTSHK CVPASWRCDG
        160         170         180         190         200
EKDCEGGADE AGCATLCAPH EFQCGNRSCL AAVFVCDGDD DCGDGSDERG
        210         220         230         240         250
CADPACGPRE FRCGGDGGGA CIPERWVCDR QFDCEDRSDE AAELCGRPGP
        260         270         280         290         300
GATSAPAACA TASQFACRSG ECVHLGWRCD GDRDCKDKSD EADCPLGTCR
        310         320         330         340         350
GDEFQCGDGT CVLAIKHCNQ EQDCPDGSDE AGCLQGLNEC LHNNGGCSHI
        360         370         380         390         400
CTDLKIGFEC TCPAGFQLLD QKTCGDIDEC KDPDACSQIC VNYKGYFKCE
        410         420         430         440         450
CYPGYEMDLL TKNCKAAAGK SPSLIFTNRH EVRRIDLVKR NYSRLIPMLK
        460         470         480         490         500
NVVALDVEVA TNRIYWCDLS YRKIYSAYMD KASDPKEQEV LIDEQLHSPE
        510         520         530         540         550
GLAVDWVHKH IYWTDSGNKT ISVATVDGGR RRTLFSRNLS EPRAIAVDPL
        560         570         580         590         600
RGFMYWSDWG DQAKIEKSGL NGVDRQTLVS DNIEWPNGIT LDLLSQRLYW
        610         620         630         640         650
VDSKLHQLSS IDFSGGNRKT LISSTDFLSH PFGIAVFEDK VFWTDLENEA
        660         670         680         690         700
IFSANRLNGL EISILAENLN NPHDIVIFHE LKQPRAPDAC ELSVQPNGGC
        710         720         730         740         750
EYLCLPAPQI SSHSPKYTCA CPDTMWLGPD MKRCYRAPQS TSTTTLASTM
        760         770         780         790         800
TRTVPATTRA PGTTVHRSTY QNHSTETPSL TAAVPSSVSV PRAPSISPST
        810         820         830         840         850
LSPATSNHSQ HYANEDSKMG STVTAAVIGI IVPIVVIALL CMSGYLIWRN
        860         870         880         890         900
WKRKNTKSMN FDNPVYRKTT EEEDEDELHI GRTAQIGHVY PAAISSFDRP
        910         920         930         940         950
LWAEPCLGET REPEDPAPAL KELFVLPGEP RSQLHQLPKN PLSELPVVKS
        960
KRVALSLEDD GLP
```

FIG. 1

METHOD FOR DETECTING THE PRESENCE AND QUANTITY OF THE LRP8 RECEPTOR AND OF ITS PROTEOLYTIC FRAGMENTS, DETECTION KIT AND RELATED ANTIBODIES

FIELD OF THE INVENTION

The present invention relates to a method for detecting the presence and quantity of Low-Density Lipoprotein Receptor-Related Protein 8 (LRP8) and of its carboxyl-terminal proteolytic fragments in biological samples isolated from the human body. The invention also relates to a kit for the detection of LRP8 and of its fragments, as well as the antibodies used in the kit and directed against LRP8 and its fragments, to be used in the method and for the diagnosis of neurodegeneration in diseases such as Alzheimer's disease, Down syndrome and cancers.

BACKGROUND OF THE INVENTION

AD, Alzheimer's Disease, falls within the category of degenerative type dementia therefore it has a particularly insidious onset and does not have a specific elementary neurological framework. In general, however, AD is characterized by the progressive extension of neuronal degenerative lesions, the consequences of which are the progressive depletion of some neuronal populations and progressive presynaptic neurotransmitter insufficiency. Morphologically, cerebral atrophy can cause greater reductions of the weight of the brain than those due to normal ageing, saving the projection areas but compromising the association ones. Histologically, endoneuronal degenerations are found, among which the most common one is neurofibrillary, and extra-neuronal degenerations, among which argyrophilic (or senile) plaques are the most common ones.

The disorders presented by subjects affected by AD include both short term memory disorders (daily facts) and long term ones. They also have difficulty with the awareness and explanation of past events or they behave in the present as though they were in a past experience far from their current existence. Further typical disorders are connected with oral and written language that leads them to have difficulty planning speech, aphasia, inappropriate spontaneous speech, alexia (inability to read) and agraphia (inability to write); difficulty recognizing conventional graphic signs and common objects; alterations to mobility, sensitivity and coordination of movements and gestures that lead to significant daily problems such as, for example, wearing clothes correctly; the tendency to get lost in places; poor ability to concentrate; cognitive disorders.

All of the aforesaid disorders obviously compromise social and working life both in subjects suffering from AD and the people who have to look after them such as relatives, caregivers and friends.

It is to be noted that, according to statistical data, the incidence of cases of AD reaches 8-10% in subjects over 65 and even 30-50% in those over 80, considering that the average human life expectancy over recent decades has increased and is around 80-85.

Therefore, AD is a social problem of significant relevance and, therefore, it is the subject matter of numerous clinical studies that aim to identify early onset and to find new therapies that can effectively fight the causes of said disease.

Unfortunately, the correct and early identification of AD, particularly in sporadic and late forms, cannot always be formulated, either due to the difficulty in distinguishing the symptoms thereof with respect to other forms of dementia, or due to the lack of indicators and precise and reliable markers. In other words, diagnostics are not currently able to offer valid and effective methods of identifying AD especially in the earlier stages so as to be able to intervene as soon as possible. Additionally, there are no effective drugs currently available for this disease.

In fact, great efforts have been focused on the study of the proteolytic processing of amyloid precursor protein (AβPP), a Type I membrane protein, by β-enzymes, and γ-secretase, as its alteration seems to be the triggering cause of AD. Therefore, the current aim is to find in particular γ-secretase inhibitors as such enzymatic complex is considered to be a cornerstone in the development of the evolution of AD. In fact, it seems that an alteration of the proteolytic function of the latter leads to the production of neurotoxic β-amyloid peptides. Alternatively, other lines of research have focused on the production of murine and humanized monoclonal antibodies able to develop an immune response against Aβ so as to block the neurotoxic potential thereof. However, such antibodies have been shown to be ineffective, not sufficiently specific (probably due to the cross-reactivity with other proteins and/or the target protein in a context of normal physiological conditions), and have also induced significant side effects. Therefore, to date, neither of the approaches are practical or therapeutically exploitable.

For example, Larios J. et al. (Neurotrophins regulate ApoER2 proteolysis through activation of the Trk signalling pathway, BMC NEUROSCIENCE, BIOMED CENTRAL, LONDON GB, vol. 15, no. 1, 19 Sep. 2014) describe the use of a rabbit polyclonal antiserum against the cytoplasmic domain of ApoER2 recombinant human protein (A3481 by SIGMA Aldrich) which detects a band of 17 kDa. This commercial antibody recognizes a sequence corresponding to the C-terminal portion of LRP8 protein, i.e. the amino acids 928-945. However, this region is normally split into smaller fragments that are not identified by the antibody.

Pitts M. W. Et al. (Deletion of selenoprotein P results in impaired function of parvalbumin interneurons and alterations in fear learning and sensorimotor gating, NEUROSCIENCE, NEW YORK, NY, US, vol. 208, 10 Feb. 2012) describe the interaction between selenoprotein P (Sepp1) and the ApoER2 receptor and the correlation with the release of selenium in the defence against oxidative stress. To evaluate the potential influence of Sepp1 on PV interneurons in mice, the expression profiles of ApoER2 were mapped. For this purpose a polyclonal goat antibody was used which binds close to the C-terminal portion of ApoER2. However, no fragment of the processing of ApoER2 is described.

Beffert U. et al. (ApoE Receptor 2 controls neuronal survival in the adult brain, CURRENT BIOLOGY, CURRENT SCIENCE, GB, vol. 16, no. 24, 19 Dec. 2006) describe studies on mice brains selected for developing different forms of ApoER2. ApoER2 was therefore immunoprecipitated with a C-terminal antibody of ApoER2 (α-CT-ApoER2). Also in this case no specific fragment of ApoER2 is described, also considering that no Western Blotting experiment is described.

Hoe H. S. et al. (Effects of ApoE on neuronal signalling and APP processing in rodent brain, BRAIN RESEARCH, ELSEVIER, AMSTERDAM, NL, vol. 1112, no. 1, 27 Sep. 2006) describe in vivo studies for confirming in vitro studies on the increased activation of ERK and decreased activation of JNK through ApoE receptors following the administration in primary neuronal cells of ApoE or an EP derived peptide thereof. For these studies a polyclonal rabbit antibody was used which recognizes the C-terminal portion of ApoER2. However, the target sequence of said portion is not specified.

Sogorb-Esteve Aitana et al. (Inhibition of γ-secretase leads to an increase in presenilin-1, MOLECULAR NEUROBIOLOGY HUMANA PRESS, US, vol. 5, no. 6, 16 Aug. 2017) describe studies that are based on the amyloid hypothesis for the study of Alzheimer's disease. In particular, the use of a polyclonal antiserum against the C-terminal portion of ApoER2 in brain extracts is described. However, the sequence of said portion is not specified.

Furthermore, it is known that γ-secretase is also involved in the onset of tumours. Therefore, γ-secretase inhibitors are a very significant pharmaceutical target also for such diseases. In this case, however, there are potential clinical applications in the study phase.

Likewise, high levels of AβPP have been found in subjects affected by Down syndrome (DS). Therefore, an early analysis of such syndrome that is less invasive than chorionic villus sampling or amniocentesis and more precise than nuchal translucency is also of great interest.

SUMMARY OF THE INVENTION

The technical problem at the base of the present invention is therefore that of devising a method for the detection and quantification of specific and early markers in order to provide valid indications for the diagnosis of tumours and neurodegeneration in AD and in DS and, therefore, lead to the identification of a target for the development of effective therapies in the treatment thereof.

Such problem is solved, according to the present invention, by a method for the detection and quantification of the full length LRP8 receptor protein, or LRP8-FL (LRP8 Full Length) and of its C-terminal fragments LICDs (LRP8 IntraCellular Domain) through selectively targeted antibodies against specific target sequences of the receptor itself and of said fragments thereof.

Further subject matter of the invention is therefore the selective antibodies to be used in such method, or fragments thereof that bind the aforesaid antigens.

Further subject matter is a kit for the implementation of said method.

BRIEF DESCRIPTION OF THE DRAWINGS

Further characteristics and advantages of the method for detecting and quantifying LRP8 and its fragments according to the invention will become clearer from the following description of an embodiment provided purely by way of non-limiting example with reference to the following figures, wherein:

FIG. 1 shows the amino acid sequence of the protein LRP8;

DETAILED DESCRIPTION OF THE INVENTION

Figures 2, 3:
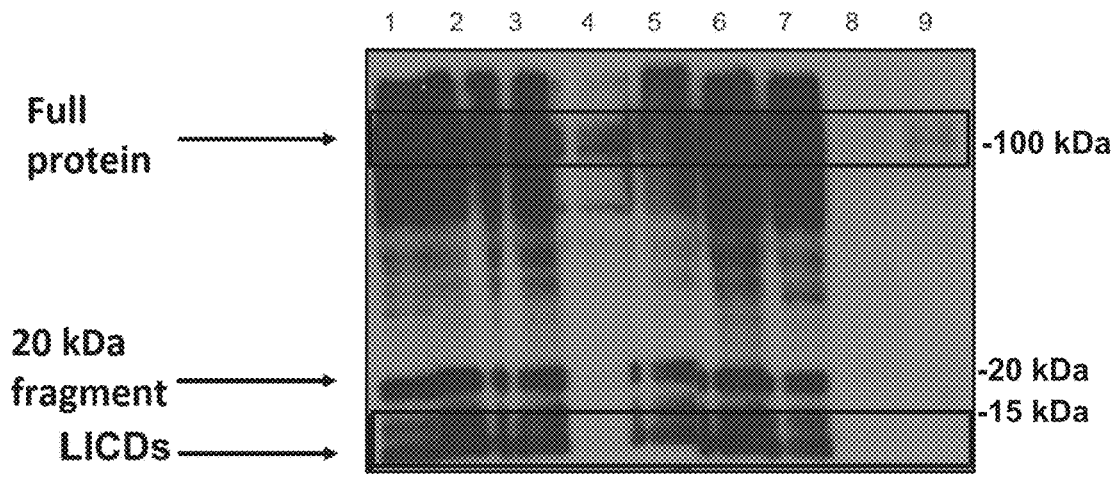
FIG. 2 shows the amino acid sequence of the alignment of the C-terminal region of the four different main splicing isoforms of the protein LRP8.
FIG. 3 shows the result of a Western blotting analysis with different monoclonal antibodies according to the present invention.

Current knowledge indicates that the processing of AβPP protein by β- and γ-secretase is certainly a key event in the genesis of AD. It is likely that γ-secretase could play quite a significant role in carcinogenesis, due to the processing of different substrates (including AβPP and LRP8) involved in the promotion or progression of tumours and in metastasization.

In particular, it is known that AβPP is a receptor of the cell surface that performs physiological functions on the surface of the significant neurons for the growth of neurites, neuronal adhesion and axonal genesis. It is also involved in cell motility and in the regulation of transcription through protein-protein interactions. It also functions as a kinesin-I membrane receptor, mediating the transport in the axon of presenilin 1 and β-secretase.

In relation to alterations connected with the processing of AβPP, as well as overexpression or specific punctiform mutations of the AβPP gene, familiar forms of AD are caused by mutations or deletions in presenilin 1 (PSEN1) and 2 (PSEN2) genes: the catalytic components of the proteolytic enzyme γ-secretase. One of the most accredited hypotheses on the cause of said alterations, called "amyloid hypothesis", is based on the assumption that the aberrant processing of AβPP through γ-secretase induces the formation of specific β-amyloid (Aβ) soluble neurotoxic peptides which, in turn, cause neurodegeneration (Selkoe and Hardy, 2016) which leads to the pathogenesis of AD.

However, this theory has recently highlighted important limits and, in particular, some points have emerged that lead to the debate: "function gain" vs. "function loss" of presenilins (as catalytic components of the γ-secretase enzymatic complex) in the genesis of AD (Shen, 2014; Shen e Kelleher, 2007); the presence of numerous and different substrate proteins of γ-secretase that interact with AβPP, potentially influencing the formation of Aβ (Haapasalo e Kovacs, 2011) and the pathogenesis of AD. This last consideration is interesting but, precisely because of the increasing number of γ-secretase substrates and their mutual interaction with AβPP, it is significantly unexplored.

Therefore, to date, therapies based on γ-secretase inhibitors (that aim to reduce the production of Aβ), or on the immunological control of Aβ peptides, have failed both at pre-clinical and clinical level, suggesting that other conditions contribute to the development of AD in parallel to the processing of AβPP through γ-secretase.

Therefore, in the current state of knowledge, there is no clear information on which substrates of γ-secretase are effectively involved in the development of AD. Therefore, such condition does not allow diagnostic methods and therapies to be developed that are actually effective in the early identification of AD and in the provision of targeted and effective pharmaceuticals.

As already mentioned, the involvement of γ-secretase is also known in the development of tumours as some of its substrates (particularly Notch, DCC, cadherin, L1-CAM, CD44, etc.) are directly connected with carcinogenic and/or metastatization processes. Therefore, particular scientific efforts have focused on therapeutic approaches that block the activity of γ-secretase, using specific inhibitors or rather "modulators" also in tumours.

It is also known that, in general, scientific literature mentions more than ninety proteins that constitute putative substrates of γ-secretase, suggesting involvement in a plethora of activities that are difficult to understand.

The idea at the basis of the present invention was therefore that of searching among these proteins for those which, as well as being substrates of γ-secretase, were expressed at neuronal level, also interacted with AβPP, were a receptor for the apolipoprotein E (ApoE) and that had the transmembrane portion and the cleavage site of γ-secretase most similar to AβPP.

This idea was developed following a new hypothesis with respect to the so-called "amyloid hypothesis", based on which there should be a parallel path to the formation of the protein β-amyloid which would involve different substrates of γ-secretase. Therefore, among the approximately ninety different proteins known such as γ-secretase substrates, the protein LRP8, also known as APOER2, was selected, the amino acid sequence of which is represented in FIG. 1 (SEQ ID NO: 14; Uniprot Q14114). Efforts focused on the investigation of said protein in response to different conditions, i.e. the evaluation of the proteolytic pattern in subjects affected by AD with respect to subjects not affected by AD.

The investigation on the quantification of LRP8 was developed by means of a method according to the present invention, comprising a phase of placing in contact a biological sample isolated from the human body with a monoclonal or polyclonal antibody targeted against a specific amino acid sequence of the C-terminal portion of LRP8 identified by the amino acid residues 837-963 (according to the numbering of the isoforms SEQ ID NOs: 15 and 18; Q14114-1 and Q14114-4 UniProtKB, FIG. 2). It was surprisingly observed that an antibody constructed in such a way was able to recognize both the full-length protein PM of about 100-105 kDa, and migrated C-terminal fragments between 18 and 75 kDa (γ-secretase substrates and possibly of other proteases) and, even more surprisingly, smaller migrated fragments between 8 and 16 kDa in SDS, in particular between 8 and 12 kDa. Precisely the detection of these smaller fragments, i.e. smaller than 17 kDa, was surprisingly important in providing an early diagnosis of AD more specifically with respect to the detection of larger fragments through the use of known antibodies. In fact, as reported below, thanks to the experiments at the basis of the present invention, it was found that in the aforesaid diseases the small fragments increase and the full-length protein decreases. Therefore, it is crucial to identify the quantity of these fragments less than 17 kDa together with the quantity of full-length LPR8.

In particular, the C-terminal amino acid sequence of the amino acid residues 837-963 is constituted by the sequence:

```
                                            (SEQ. I.D. 1)
IALLCMSGYLIWRNWKRKNTKSMNFDNPVYRKTTEEEDEDELHIGRTAQI

GHVYPAAISSFDRPLWAEPCLGETREPEDPAPALKELFVLPGEPRSQLHQ

LPKNPLSELPVVKSKRVALSLEDDGLP.
```

Preferably, within the aforesaid sequence, particularly effective sub-sequences have been identified, selected from the group consisting of the amino acid residues:

```
837-857
(IALLCMSGYLIWRNWKRKNTK, SEQ I.D. 2), 850-864
(NWKRKNTKSMNFDNP, SEQ I.D. 3), 863-878
(NPVYRKTTEEEDEDEL, SEQ I.D. 4), 874-887
(DEDELHIGRTAQIG, SEQ I.D. 5), 882-898
(RTAQIGHVYPAAISSFD, SEQ I.D. 6), 898-917
(DRPLWAEPCLGETREPEDPA, SEQ I.D. 7), 915-940
(DPAPALKELFVLPGEPRSQLHQLPKN, SEQ I.D. 8), 940-963
(NPLSELPVVKSKRVALSLEDDGLP, SEQ I.D. 9).
```

More preferably, the sequences of the residues 874-887 (SEQ I.D. 5) and 940-963 (SEQ I.D. 9) are those that have provided the best results in terms of recognition of C-terminal fragments, LICDs as defined in the present description, and of the full-length protein LRP8.

As it is used here, the term "amino acid" is intended to indicate both natural amino acids and mimetic amino acids. Natural amino acids comprise 20 (L)-amino acids used during the biosynthesis of proteins, and others, for example 4-hydroxyproline, hydroxylysine, desmosine, isodesmosine, homocysteine, citrulline and ornithine. Non-natural amino acids include, for example, (D)-amino acids, norleucine, norvaline, p-fluorophenylalanine, ethionine and the like. Analogs of amino acids include modified forms of natural and non-natural amino acids. Such modifications can include, for example, the substitution or replacement of chemical groups and molecules on amino acids or through the derivatization of the amino acid (e.g. o-bromo-L-phenylalanine). Mimetic amino acids comprise, for example, organic structures that have functionally similar properties, such as the load and spacing of loads, to the characteristics of the reference amino acids. For example, an organic structure that imitates arginine (Arg or R) would have a positive load portion localized in the similar molecular space and having the same degree of mobility as the ε-amino group of the lateral chain of the natural amino acid Arg.

The amino acid sequences according to the invention constitute polypeptides or fragments, variants or derivatives thereof isolated from the human body in the sense that they are not in their natural environment. They preferably derive from recombining technology and expression in host cells from which they are separated, fractioned, partially or substantially purified according to conventional methods.

With reference to the antibodies developed against the aforesaid sequences, fragments, variants, derivatives or analogs means any antibody or antibody peptide that maintains the property of antigen bond. Altered amino acid sequences are sequences in which there are substitutions, deletions or insertions of amino acids according to what is described above.

Further subject matter is a nucleotide sequence that can be translated and transcribed in the aforesaid sequences that develop specific antibodies for use in the method of the present invention. These nucleotide sequences can be produced through conventional molecular biology methods that use for example reverse transcription in known viral systems (Molecular Cloning-A Laboratory Manual, Sambrook and Russel, Cold Spring Harbor).

It is to be noted that the terms antibody and immunoglobin in the present description can be used interchangeably and equally identify an antigen binding molecule that comprises at least the variable domain of a heavy chain and normally at least the variable domains of a heavy chain and of a light chain, or single chain antibodies, or minibodies (Harlow et al., Antibodies, "A laboratory Manual", Cold Spring Harbor Laboratory Press, Second Edition, 2014).

The method of the invention can be selected from any one of the known analytical methods comprising the aforesaid step of placing the antibody in contact against any one or more of the sequences described above. The method is preferably selected from among ELISA (direct, sandwich, etc.), separation and detection by lateral flow, mono and bi-dimensional electrophoresis, Western Blotting, immunoprecipitation followed by any one of the preceding techniques, RIA, electrophoresis or HPLC or FPLC, or any chromatographic method followed by a detecting technique such as the preceding one, Surface Plasmon Resonance (SPR) or similar approaches based on interferometry, wherein the antibodies of the invention are used either as capturing or interacting molecules, mass spectroscopy after purification of the biological sample with HPLC, nano-HPLC chromatographic methodologies. As these methods are widely known to a person skilled in the art they will not be reported herein.

Regardless of the analytical method used, the biological samples separated from the human body can be pre-treated before being subjected to investigation techniques. In fact, biological samples can derive from body fluids or tissues. In particular, the fluids can be cerebrospinal fluid (CSF), plasma, complete blood, tear fluid, urine, body secretions, whereas the tissues may be brain tissue, nasal brush samples, epithelial tissue of the mucosa. In the event of using a biological sample of brain tissue, the detection method comprises a preparatory step of crushing the sample according to conventional methods (e.g. sonication, homogenization with solvents, buffers, detergents and other solutions) followed by precipitation/isolation of the protein fraction. The protein fraction is then incubated with the antibody of the present invention. Subsequently, the samples thus prepared are subjected to detection analysis according to any one of the aforesaid methods. If the biological sample is of the histological type and therefore intended for immunohistochemical analysis, it is subjected to preventive fixing, according to absolutely conventional methods.

The specific target sequences of recognition by the antibodies were identified after numerous experiments aiming to find the sequences that very selectively characterize both the protein LRP8-FL and its C-terminal fragments, defined as LICDs, and deriving from the processing of LRP8 by γ-secretase or by other endoproteolytic enzymes such as metalloprotease, aspartyl-protease, serine protease and cysteine protease. It is to be noted that in physiological conditions LRP8 is processed so as to release a few C-terminal fragments within the cell.

In particular, it is known from scientific literature that C-terminal fragments of LRP8 with a length comprised between 20 and 24 kDa are produced following the block of γ-secretase performed by the DAPT inhibitor (Hoe and Rebeck, 2005; Hoe et al., 2006). The present invention, instead, highlights how smaller fragments, i.e. fragments from 8 to 16 kDa, are more important in the diagnosis of many diseases as they have been found in large quantities in biological samples isolated from the human body in diseases subjects. Therefore, in the present description the term LICDs identifies the migrated C-terminal fragments of LRP8 in SDS-PAGE between 8 and 16 kDa, preferably between 8 kDa and 12 kDa. These fragments, as previously explained, comprise the aforesaid amino acid sequences and are advantageously recognized by the antibodies developed so as to recognize both LICDs, i.e. the smallest fragments between 8 and 16 kDa, and other fragments with a higher molecular weight (substrates of γ-secretase and possibly also of other proteases) migrated between 18 and 75 kDa.

The analyses performed with the method according to the invention have led to the discovery of a particularly high quantity of LICDs and to the simultaneous reduction of the quantity of full-length LRP8 protein, in samples of AD patients with respect to non-AD controls.

LRP8 is a type I transmembrane receptor protein whose amino acid sequence is reported in FIG. 1 (SEQ. I.D. 14) and is available for example in the Uniprot database with identification number Q14114. It is known that such protein has four different main splicing isoforms (SEQ I.D. 15, SEQ I.D. 16, SEQ I.D. 17, SEQ I.D. 18) whose alignment of the respective C-terminal regions is reported in FIG. 2.

According to the present invention, the aforesaid sequences have been identified at the C-terminal end of LRP8 as target sites for recognition by specific selective antibodies.

In particular, polyclonal and monoclonal antibodies have been developed. Both polyclonal and monoclonal antibodies have been created through conventional methods that shall therefore not be described in detail herein. In relation to monoclonal antibodies, it was chosen to use as an immunogen preferably the sequence SEQ. I.D. 5 with the addition of a cysteine Cys at the C end for coupling with KLH or an analogous protein or peptide that has the capacity to bond in turn to target proteins of interest, such as the sequences according to the present invention or more generally haptenes that however have poor immunogenic capacity, so as to reinforce such capacity thereof. A reference to the methods for the production of such antibodies can be found for example in "*Critical Steps in the Production of Polyclonal and Monoclonal Antibodies: Evaluation and Recommendations*", Marlies Leenaars, Coenraad F. M. Hendriksen (ILAR Journal, Volume 46, Issue 3, 1 Jan. 2005, Pages 269-279) in which specific bibliographical references can also be found on the conditions of the individual operating steps.

In any case, when polyclonal antibodies are used, the serum taken from the immunized mammal (e.g. mouse, rabbit, goat, horse) with the aforesaid antigens is treated conventionally so as to purify the antibodies developed through, for example, immunoaffinity chromatography. Furthermore, the antibodies can be humanized, xenogeneic or human-murine chimeric.

As for the production of monoclonal antibodies, the hybridoma technique is widely known and generally envisages the use of immortal cell lines created by cell fusion or other techniques such as the direct transformation of B lymphocytes with oncogenic DNA or transfection with virus (e.g. M. Schreier et al. "Hybridoma Techniques", 1980; Hammerling et al., "Monoclonal Antibodies and T-cell Hybridomas", 1981; Kennet et al., Monoclonal Antibodies, 1980; Harlow et al., Antibodies, "A laboratory Manual", Cold Spring Harbor Laboratory Press, Second Edition, 2014). In particular, clones of hybridomas deposited at the Advanced Biotechnologies Centre (CBA)/Interlab Cell Line Collection of San Martino University Hospital IST, National Institute for Cancer Research, of Genoa (Italy) with numbers 17E11C2 and 25F7F1 were produced.

The sequences of antibodies of the cell lines 17E11C2 and 25F7F1 were identified by GenScript and are reported respectively in the following tables. For identification, the materials used were the reactant TRIzol® (Ambion, Cat. No.: 15596-026), the synthesis kit PrimeScript™ 1st Strand cDNA (Takara, Cat. No.: 6110A). The method envisages the isolation of the total RNA from the cells of the hybridomas following the TRIzol® Reagent manual. The total RNA was then reverse transcribed in cDNA using both the anti-sense isotype-specific primer and universal primers following the PrimeScript™ 1st Strand cDNA Synthesis Kit manual. Fragments of antibody of the heavy chain and of the light chain were amplified according to the standard operating procedure (SOP) of rapid amplification of the ends of cDNA (RACE) of GenScript. The fragments of amplified antibodies were cloned separately in a standard cloning vector. PCR on colonies was performed in order to select clones with inserts of the correct size. The consensus sequence was provided. For the analysis of the sequences any suitable free online program can be used, preferably NCBI Nucleotide BLAST, IMGT/V Quest program and NCBI IgBLAST.

Hybridoma 17E11C2

TABLE 1

| Heavy chain: DNA sequence (414 bp) | |
|---|---|
| Signal sequence | ATGGGATGGAGCTGGATCTTTCTCTTCCTCCTGTCAGG AACTGCAGGTGTCCACTCT (SEQ I.D. No. 19) |
| FR1 | GAGGTCCAGCTGCAACAGTCTGGACCTGTGCTGGTGAA GCCTGGGGCTTCAGTGAAGATGTCCTGTAAGGCTTCTG GATACAAATTCACT (SEQ I.D. No. 20) |
| CDR1 | GACTACTTTATGAAC (SEQ I.D. No.21) |
| FR2 | TGGGTGAAGAAGAGCCATGGAAAGAGCCTTGAGTGGAT TGGA (SEQ I.D. No. 22) |
| CDR2 | GTTATTAATCCTTACAACGGTGGTACTAGATACAACCA GAAGTTCAAGGGC (SEQ I.D. No. 23) |
| FR3 | AAGGCCACATTGACTGTTGACAAGTCCTCCAGCACAGC CTACATGGAGCTCAACAGCCTGACATTTGAGGACTCTG CAGTCTATTACTGTGCAAGG (SEQ I.D. No. 24) |
| CDR3 | GAGACGGTAGACCTTGCCTGGTTTGTTCAC (SEQ I.D. No. 25) |
| FR4 | TGGGGCCAAGGGACTCTGGTCACTGTCTCTGCA (SEQ I.D. No. 26) |

Hybridoma 17E11C2

TABLE 2

| Heavy chain: amino acid sequence (138 aa) | |
|---|---|
| Signal peptide | MGWSWIFLFLLSGTAGVHS (SEQ I.D. No. 27) |

TABLE 2-continued

| Heavy chain: amino acid sequence (138 aa) | |
|---|---|
| FR1 | EVQLQQSGPVLVKPGASVKMSCKASGYKFT (SEQ I.D. No. 28) |
| CDR1 | DYFMN (SEQ I.D. No. 29) |
| FR2 | WVKKSHGKSLEWIG (SEQ I.D. No. 30) |
| CDR2 | VINPYNGGTRYNQKFKG (SEQ I.D. No. 31) |
| FR3 | KATLIVDKSSSTAYMELNSLTFEDSAVYYCAR (SEQ I.D. No. 32) |
| CDR3 | ETVDLAWFVH (SEQ I.D. No. 33) |
| FR4 | WGQGTLVTVSA (SEQ I.D. No. 34) |

Hybridoma 17E11C2

TABLE 3

| Light chain: DNA sequence (393 bp) | |
|---|---|
| Signal sequence | ATGAAGTTGCCTGTTAGGCTGTTGGTGCTGATGTTC TGGATTCCTGCTTCCAGCAGT (SEQ I.D. No. 35) |
| FR1 | GATGTTTTGATGACCCAAACTCCACCCTCCCTGCCT GTCACTCTTGGAGATCAGGCCTCCATCTCTTGC (SEQ I.D. No. 36) |
| CDR1 | AGATCTAGTCAGAGTATTGTATATAGTAATGGAAAC ACCTACTTAGAA (SEQ I.D. No. 37) |
| FR2 | TGGTACCTGCAGAAGCCAGGCCAGTCTCCAAAGCTC CTGATCTAC (SEQ I.D. No. 38) |
| CDR2 | AAAGTTTCCAACCGATTTTCT (SEQ I.D. No. 39) |
| FR3 | GGGGTCCCAGACAGGTTCAGTGGCAGTGGATCAGGG ACAGATTTCACACTCAAGATCAGCAGAGTGGAGGCT GAGGATCTGGGAATTTATTACTGC (SEQ I.D. No. 40) |
| CDR3 | TTTCAAGGTTCACATGTTCCGCTCACG (SEQ I.D. No. 41) |
| FR4 | TTCGGTGCTGGGACCAAGCTGGAGCTGAAA (SEQ I.D. No. 42) |

Hybridoma 17E11C2

TABLE 4

| Light chain: amino acid sequence (131 aa) | |
|---|---|
| Signal peptide | MKLPVRLLVLMFWIPASSS (SEQ I.D. No. 43) |
| FR1 | DVLMTQTPPSLPVTLGDQASISC (SEQ I.D. No. 44) |
| CDR1 | RSSQSIVYSNGNTYLE (SEQ I.D. No. 45) |
| FR2 | WYLQKPGQSPKLLIY (SEQ I.D. No. 46) |
| CDR2 | KVSNRFS (SEQ I.D. No. 47) |
| FR3 | GVPDRFSGSGSGTDFTLKISRVEAEDLGIYYC (SEQ I.D. No. 48) |

TABLE 4-continued

Light chain: amino acid sequence (131 aa)

| | |
|---|---|
| CDR3 | FQGSHVPLT (SEQ I.D. No. 49) |
| FR4 | FGAGTKLELK (SEQ I.D. No. 50) |

Hybridoma 25F7F1

TABLE 5

Heavy chain: DNA sequence (414 bp)

| | |
|---|---|
| Signal sequence | ATGGGATGGAGCTGGATCTTTCTCTTCCTCCTGTC AGGAACTGCAGGTGTCCACTCT (SEQ I.D. No. 51) |
| FR1 | GAGGTCCAGCTGCAACAGTCTGGACCTGTGCTGGT GAAGCCTGGGGCTTCAGTGAAGATGTCCTGTAAGG CTTCTGGATACAAATTCACT (SEQ I.D. No. 52) |
| CDR1 | GACCACTTTATGAAC (SEQ I.D. No. 53) |
| FR2 | TGGGTGAAGAAGAACCATGGAAAGAGCCTTGAGTG GATTGGG (SEQ I.D. No. 54) |
| CDR2 | GTTATTAATCCTTACAACGGTGGTACTAGGCTCAA CCCGAAGTTTAAGGGC (SEQ I.D. No. 55) |
| FR3 | AAGGCCACATTGACTGTTGACAAGTCCTCCAGCAC AGTCCTACATGGAGCTCAACAGCCTGACATTTGAGG ACTCTGCAGTCTATTACTGTGCAAGG (SEQ I.D. No. 56) |
| CDR3 | GAGACTATAGACCTTGCCTGGTTTGCTTAT (SEQ I.D. No. 57) |
| FR4 | TGGGGCCAGGGGACTCTGGTCACTGTCTCTGCA (SEQ I.D. No. 58) |

Hybridoma 25F7F1

TABLE 6

Heavy chain: amino acid sequence (138 aa)

| | |
|---|---|
| Signal Peptide | MGWSWIFLFLLSGTAGVHS (SEQ I.D. No. 59) |
| FR1 | EVQLQQSGPVLVKPGASVKMSCKASGYKFT (SEQ I.D. No. 60) |
| CDR1 | DHFMN (SEQ I.D. No. 61) |
| FR2 | WVKKNHGKSLEWIG (SEQ I.D. No. 62) |
| CDR2 | VINPYNGGTRLNPKFKG (SEQ I.D. No. 63) |
| FR3 | KATLTVDKSSSTVYMELNSLTFEDSAVYYCAR (SEQ I.D. No. 64) |
| CDR3 | ETIDLAWFAY (SEQ I.D. No. 65) |
| FR4 | WGQGTLVTVSA (SEQ I.D. No. 66) |

Hybridoma 25F7F1

TABLE 7

Light chain: DNA sequence (393 bp)

| | |
|---|---|
| Signal sequence | ATGAAGTTGCCTGTTAGGCTGTTGGTGCTGATG TTCTGGATTCCTGCTACCAGCAGT (SEQ I.D. No. 67) |

TABLE 7-continued

Light chain: DNA sequence (393 bp)

| | |
|---|---|
| FR1 | GATGTTTTGATGACTCAAACTCCACCCTCCCTG CCTGTCACTCTTGGAGATCAGGCCTCCATCTCT TGC (SEQ I.D. No. 68) |
| CDR1 | AGATCTAGTCAGAGTATTGTATATAGTAATGGA AAAACCTATTTAGAA (SEQ I.D. No. 69) |
| FR2 | TGGTACCTGCAGAAGCCAGGCCAGTCTCCAAAG CTCCTGATGTAC (SEQ I.D. No. 70) |
| CDR2 | AAAGTTTCCAACCGATTTTCT (SEQ I.D. No. 71) |
| FR3 | GGGGTCCCAGACAGGTTCAGTGGCAGTGGATCA GGGACAGATTTCACACTCAAGATCAGCAGCGTG GAGGCTGAGGATCTGGGAATTTATTACTGC (SEQ I.D. No. 72) |
| CDR3 | TTTCAAGGTTCACATGTTCCGCTCACG (SEQ I.D. No. 73) |
| FR4 | TTCGGTGCTGGGACCAAGCTGGAGCTGAAA (SEQ I.D. No. 74) |

Hybridoma 25F7F1

TABLE 8

Light chain: amino acid sequence (131 aa)

| | |
|---|---|
| Signal peptide | MKLPVRLLVLMFWIPATSS (SEQ I.D. No. 75) |
| FR1 | DVLMTQTPPSLPVTLGDQASISC (SEQ I.D. No. 76) |
| CDR1 | RSSQSIVYSNGKTYLE (SEQ I.D. No. 77) |
| FR2 | WYLQKPGQSPKLLMY (SEQ I.D. No. 78) |
| CDR2 | KVSNRFS (SEQ I.D. No. 79) |
| FR3 | GVPDRFSGSGSGTDFTLKISSVEAEDLGIYYC (SEQ I.D. No. 80) |
| CDR3 | FQGSHVPLT (SEQ I.D. No. 81) |
| FR4 | FGAGTKLELK (SEQ I.D. No. 82) |

Further subject matter of the present invention is therefore a monoclonal or polyclonal antibody able to bind to any one of the aforesaid sequences for use in an identification and quantification method of LRP8 and its LICDs fragments. These antibodies can be produced through recombinant host cell culture modified after the injection of an expression vector such as a plasmid constructed so as to transfer into the genetic heritage of the host the nucleotide sequences coding the amino acid sequences of interest. The nucleotide sequences that code for said antibodies can comprise any polyribonucleotide or polydeoxyribonucleotide that may be a non-modified or modified RNA or DNA. These expression systems can be designed so as to include signal molecules in order to effectively identify and separate the molecules of interest from the culture. Among the expression vectors that can be used gB324 is the preferred one, but also pcDNA3, pHCMV/Zeo, pCR3.1, pEF1/His, pIND/GS, pRc/HCMV2 and others known in the sector can be used.

Likewise, preferably, the antibodies produced according to the present invention comprise a signal molecule, i.e. a molecule able to be detected through the aforesaid analytical methods such as, for example, a fluorophore, a radioisotope, an enzyme, a heavy metal. Furthermore, antibodies or immunoglobulins can be whole molecules or antibody fragments. Immunoglobulins are notoriously IgG, IgM, IgA, IgE, IgD and related sub-classes, composed of two light chains (L) and two heavy chains (H), both chains being constituted by constant (CL, CH) and variable regions (VL, VH). The fragments can for example be single chain fragments F(ab'), F(ab), F(ab')2 fragments.

Different subject matter of the present invention is an amino acid sequence selected from the sequences SEQ I.D. 1-9, as described previously, for use in a detection and quantification method of LRP8 and its LICDs fragments.

Further subject matter of the present invention is a diagnostic kit for the determination of diseases associated with the aberrant processing of the protein LRP8. Such kit preferably comprises a micro-plate whose wells are coated with an antibody produced according to the above, a container for a control sample comprising the protein LRP8 and/or its C-terminal fragments of 8-16 kDa, a container for a diluent substance of the control sample and one for the testing sample, a container for a buffer, a container for a substrate substance, a container for a stopping-reaction solution, a container for a washing buffer. Additionally, the kit comprises an illustrative sheet with the explanations of how to prepare the samples, incubation and washing times, and photometric reading conditions of the detected signal.

According to a preferred form of the invention, the kit can comprise a reference sample or a table of pre-established data for the comparison between values and/or types of molecules detected and corresponding quantities in reference to conditions not considered pathological and pathological conditions.

As well as the techniques through ELISA as summarized above (paragraph 0048) and subsequently described in detail (see paragraph 0059), the kit can comprise the use of applications such as "SPR" (Surface Plasmon Resonance) using an optical method to measure the refraction index close to the surface of a sensor. This surface is a side of a flow cell, through which an aqueous solution (running buffer) is passed through at a continuous speed. To allow the detection of an interaction, a molecule (ligand) is immobilized on the surface of the sensor. The molecule with which an interaction is to be evaluated (analyte) is injected in aqueous solution, which has the same composition as the running buffer, through the flow cell, through a continuous flow. When the analyte is bonded to the ligand, the accumulation of proteins on the surface of the sensor causes an increase of the refraction index. This change of the refraction index is measured in real time and the result is shown as a response unit (UR) as a function of time (sensorgram).

Such technology could be used to detect the presence and affinity of the LRP8 receptor and/or its fragments, present in a biological sample, towards the monoclonal and/or polyclonal antibodies described in the present invention. In particular, such approach envisages that the kit provides the antibodies (e.g. 17E11C2 or 25F7F1) as ligands and that they are immobilized on the surface of the sensor, with an appropriate buffer, in order to search for the LRP8 receptor or fragments thereof, in a biological sample of interest. Such sample should be presented in liquid form (plasma, cerebrospinal fluid, saliva, urine . . . ) and be appropriately treated before being injected into the flow cell to measure the binding thereof and therefore the SPR with respect to a negative reference control sample (a sample from a healthy subject or a sample without LRP8 or LICDs) and a positive one (e.g. a calibration curve with known quantities of LRP8 or LICDs). Therefore, the kit will comprise at least a bio-sensor or chip provided with a transparent support carrying on one of its surfaces a metal layer (generally gold or silver) having a free surface on which the antibodies according to the present invention have been fixed, at least a support microfluidic cartridge in whose interior a buffer containing an analyte to be detected is made to flow, a container for the analyte buffer.

Another possibility for the development of diagnostic tests that aim to detect the presence of LRP8, its fragments or LICDs in biological samples of interest, such as those mentioned above, is based on a stick of plastic material which has a buffer inside it. Such kit exploits a liquid sample to be migrated along this buffer by capillarity (lateral flow). In the buffer exposed to the biological liquid to be analysed there is a specific antibody for the antigen searched for (in a typical example the monoclonal 17E11C2 could be used conjugated to coloured indicator molecules such as colloidal gold for example). The antigen-antibody complex moves by capillarity following the biological sample as far as the two strips that are initially invisible: the first is the one where the other antibody that recognizes the antigen is immobilized (in our example it could be the antibody 25F7F1 fixed onto the support), while the second strip is the control one and is where an antibody is immobilized that can recognize the crystallizable fragment (Fc) of the antibodies that can be found on the buffer. This strip represents a positive control for the successful migration of the sample to the buffer by capillarity. The successful bond of LRP8 and/or its fragments and/or of the LICDs to the first strip and of the control antibodies to the second strip is highlighted by the colouring of such bands.

If the control strip is coloured it means that the specific antibodies for LRP8, its fragments and the LICDs transported by the capillary flow of the sample have necessarily crossed the first strip; if the first strip is coloured it means that LRP8 and/or its fragments and/or the LICDs are present in the biological sample. It is also possible to use optical readers to evaluate the different colour intensities developed by the reaction between the sample and the first strip. Therefore, the kit will comprise a support having the shape of a long strip whose surface is coated with a plurality of capillary elements in succession, a first element (the sample pad) which absorbs a sample fluid, a second element (conjugated bearing) storing an antibody-signal molecule conjugate (dye), a third element carrying one or more areas (often called strips) wherein a capturing molecule has been fixed.

Below are some embodiments of the invention provided by way of non-limiting example of the invention.

Preparation of Specific Antibodies for Lrp8

According to the present invention, the isoform 1 of LRP8, which is sequentially the longest, was used for in vitro studies through cloning techniques that use cDNA for the expression both of its wild-type form and of a marked isoform at the C-terminal with the tag sequence myc-DDK. The corresponding clone was purchased from OriGene, Cat. No. RC220963. Subsequently, the transmembrane region was identified on said clones (described in the Uniprot website: http://www.uniprot.org/uniprot/Q14114, and can be identified using the public software AGADIR or TMPred available on the website https://expasy.org/). It has been seen that this region was conserved in all four isoforms and is represented by the sequence VIGIIVPIVVI-ALLCMSGYLI (SEQ. I.D. 10). Furthermore, the sequence VV-IA (SEQ I.D. 11) was identified as the putative cleavage site by γ-secretasi, such site being identical to the AβPP site that generates the fragment Aβ-40. The sequence DNPVY (SEQ I.D. 12) was also identified as the necessary site for the internalization and interaction with adaptor proteins such as JNK and Dab1. It is also known that the sequence AISSFDRPLWAEPCLGETREPEDPA-PALKELFVLPGEPRSQLHQLPKNPLSELPVVKSK (SEQ I.D. 13), present only in isoforms 1 and 4, is typical of mammals, is determined by the exon 18 in human beings and is apparently connected to the memory processes and activities of Relina, of which LRP8 is a receptor (Telese et al., 2015).

In particular, the aforesaid sequence DEDELHIGR-TAQIG (SEQ. I.D. 5) is present in all four isoforms and consists of a short sequence with loaded amino acids and is localized between the internalization sequence DNPVY and the sequence of the exon 18. The aforesaid sequence NPLSELPVVKSKRVALSLEDDGLP (SEQ I.D. 9) is instead localized at the end of the sequence 18 of the exon.

These sequences SEQ I.D. 5 and SEQ I.D. 9 were selected as the best antigens for developing monoclonal antibodies. A total of two polyclonal antibodies and two monoclonal cell lines of hybridomas against said sequences were obtained. In summary, the technique for the production of monoclonal antibodies from hybridomas envisages the immunization (with an antigen peptide sequence of the protein of interest) of an animal (generally mouse, rat or rabbit) from which spleen plasma cells are taken. In particular, BALB/c mice were immunized in the present invention. The plasma cells were immortalized through fusion with SP2/0 murine myeloma cells and then those secreting direct antibodies against the antigen of interest were selected, used in the immunization of the animal. In more detail, the individual plasma cells secrete direct antibodies against a specific epitope of the antigen protein and the monoclonal antibodies can therefore be obtained from a cell line derived from a single plasma cell. Once they are stable, the clonal lines of hybrodomas provide an almost infinite quantity of antibodies. The antibodies secreted by the cells can be used as such (supernatants) or further purified and/or concentrated by means of chromatography techniques on a column e.g. by affinity with peptides (appropriately fixed onto a support) with the sequences previously identified. In the present case the antibodies obtained from hybridomas coming from mice immunized with peptides SEQ I.D. 5 and SEQ I.D. 9 were initially used as such as cell supernatants obtained from the derived hybridomas and, subsequently, they were purified by means of chromatography by affinity using peptides with the same sequences SEQ I.D. 5 and SEQ I.D. 9 as capture peptides in the binding resin.

The two lines of hybridomas described above develop antibodies that recognize both the entire protein LRP8 and its different C-terminal fragments. In particular, it was found that hybridomas developed by immunizing animals against the sequences SEQ. I.D. 5 and 9 with a cysteine at the C-terminus are able to produce antibodies that recognize both the protein LRP8 as such, and the fragments of 18-25 kDa, which are substrates of γ-secretase and different shorter fragments of 8-16 kDa, collectively defined as LICDs-derived intracellular domain LRP8, similar to the AICDs fragments derived from the cleavage of AβPP by γ-secretase or by other proteases such as those previously specified. The polyclonal antibodies (rabbit) GS1 and GS2 were made using SEQ I.D. 5 and SEQ I.D. 9, respectively. By way of example, FIG. 3 shows the result of a Western blotting analysis is represented in which the cell lysate is obtained from N2A cells transfected with a cDNA coding for the protein LRP8 (Origene, Cat. No. RC220963) and subjected to SDS-PAGE analysis and Western blotting with the polyclonal antibodies GS1 and GS2 (lanes 1, 5), with the monoclonals 25F7F1 and 17E11C2 (lanes 2 and 3) and with other polyclonals according to SEQ I.D. 3, 4 and 8 (lanes 4, 6 and 7, respectively). In lane 8 there is a negative control whereas in lane 9 the hybridization was performed using a commercial antibody vs LRP8 (Sigma Aldrich Cat No. SAB1306331) as a positive control. All the antibodies were used at the final concentration of 1 µg/ml. It is therefore clear that both the polyclonal antibodies and the antibodies of clones of hybridomas according to the present invention are able to identify not only the full-length protein LRP8 and the fragments from 18-25 kDa, but also advantageously the fragments 8-16 kDa, as indicated by the boxes in FIG. 3. In other words, the result of the analysis highlighted how the antigen sequences of LRP8 previously described are a selective and specific target for the identification of LRP8 and its fragments in cell cultures. Similar results were also obtained with sequences SEQ I.D. 1, 2, 6-8.

Analysis on Human Brain Samples

In principle the protein levels of LRP8 and its C-terminal fragments were analysed using SDS-PAGE in Tris-Tricine buffer followed by Western Blotting. The samples derive from the temporal and frontal cortex of the human brain of 10 patients suffering from AD compared with 9 non-AD patients, both groups being subjected to the antibodies known as GS1 and GS2 developed respectively against sequences SEQ. I.D. 5 and SEQ. I.D. 9. Samples of different brain areas (frontal and temporal cerebellar cortex) of a group of subjects (5) with familial AD (FAD) having mutations on the PSEN1 gene, coding for presenilin 1, were analysed.

In particular, for each patient, about 100 mg of brain tissue were homogenated in RIPA buffer for 30" in a rotor-stator homogenizer and subsequently centrifuged at 10000×g at 4° C. for about 20 min. The supernatant was subjected to analysis of the protein fraction extracted by means of the electrophoretic technique (SDS-PAGE) in 12.5% acrylamide gel (separating) in Tris-Tricine buffer. The gel with the proteins separated was then transferred onto a 0.22 µm PVDF membrane in transfer buffer, and the same membrane marked with GS1 specific primary antibody for LRP8 and secondary anti-rabbit, such as to recognize the primary antibody and marked with HRP (GE Healthcare, Cat. No. RPN4201). Subsequently, through chemiluminescence, the detection of protein bands on an X-ray plate was performed.

Figure 4:
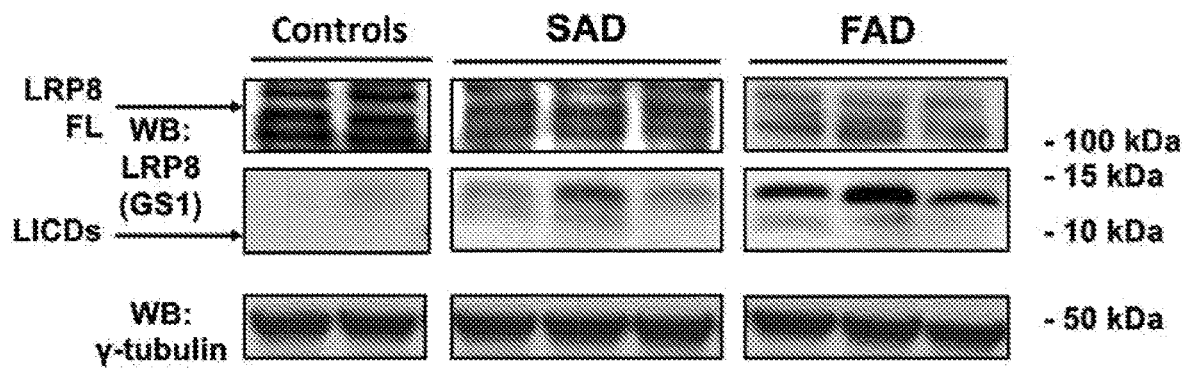
FIG. 4 shows the result of a Western blotting analysis performed after placing in contact a polyclonal antibody of the invention with samples of brain tissue taken both from patients affected by Alzheimer's dementia and subjects not affected by Alzheimer's.

FIG. 4 shows an X-ray plate obtained with the aforesaid process, in which the lanes represent the signals obtained from the same number of brain samples of non-AD subjects (control) and AD previously prepared and incubated with GS1. As can be noted, the lanes indicated with SAD and FAD show a signal that identifies a significant presence of C-terminal fragments of LRP8 comprised between 8 and 16 kDa and a parallel reduction of the full-length protein of 105 kDa with respect to the controls (Control lanes), as indicated by the exemplifying arrows of FIG. 4. On the right hand side of the WB image, the molecular weights of the marker are shown.

Figure 5:
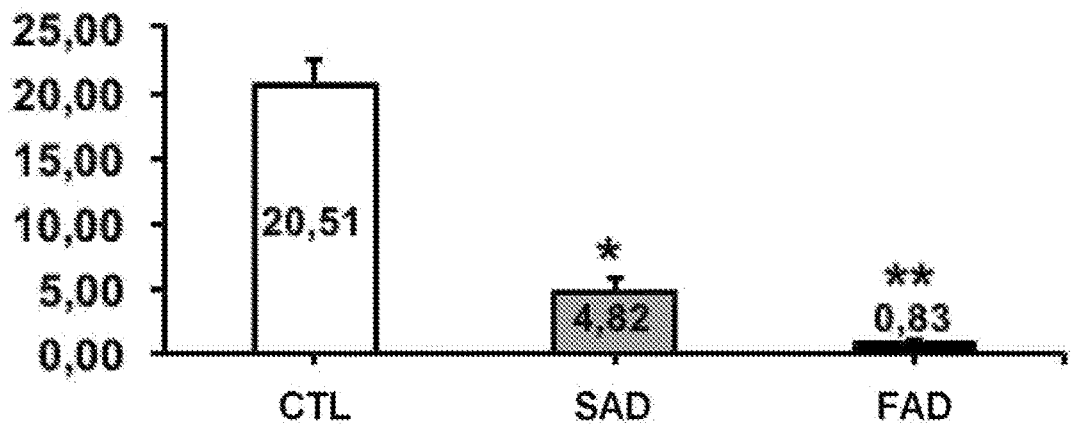
FIG. 5 shows a graph of the quantitative data of the ratio between full length protein (LRP8-FL) and C-terminal fragments between sporadic AD subjects (SAD), relatives (FAD) and unaffected subjects (controls or CTL), following densitometric analysis.

The photographic plates obtained from the Western Blot experiments were digitalized by acquisition with an imaging tool (Gel Doc EZ System, Biorad). A densiometric analysis of such digital images was performed which consists of the evaluation of the density of the protein signal with the IT software ImageLab (Biorad): such software allows the protein bands to be selected and a numerical value to be assigned to them according to the intensity of the bands. The densiometric analysis was performed as follows: for each patient the value of the full-length protein LRP8 and the normalized value of the LICDs fragments was expressed as a ratio. The mean values of the ratio between full-length protein LRP8/LICDs fragments for each group analysed (controls, SAD and FAD) were obtained with the related mean standard error. The analysis indicates that in the SAD samples a mean of 4.2 times more fragments of LICDs were found with respect to the controls. Such value comes from the ratio between the mean value of full-length LRP8 protein/LICDs fragments of the control samples (20.51) vs SAD (4.82). In fact, FIG. 5 shows the ratio between full-length LRP8 protein and LICDs respectively in control samples (CTL), samples of patients with SAD and samples of patients with FAD. If the analysis is extended to the comparison of the ratio between the full-length LRP8 protein and its LICDs fragments in the samples analysed, it is possible to note the significant reduction of the full-length protein and the parallel increase of LICDs in the FAD and SAD cases (FIG. 4) with respect to the samples of control subjects without dementia, with a consequent reduction of the ratio between the full-length protein and the fragments comprised between 8 and 16 kDa.

Figure 6:
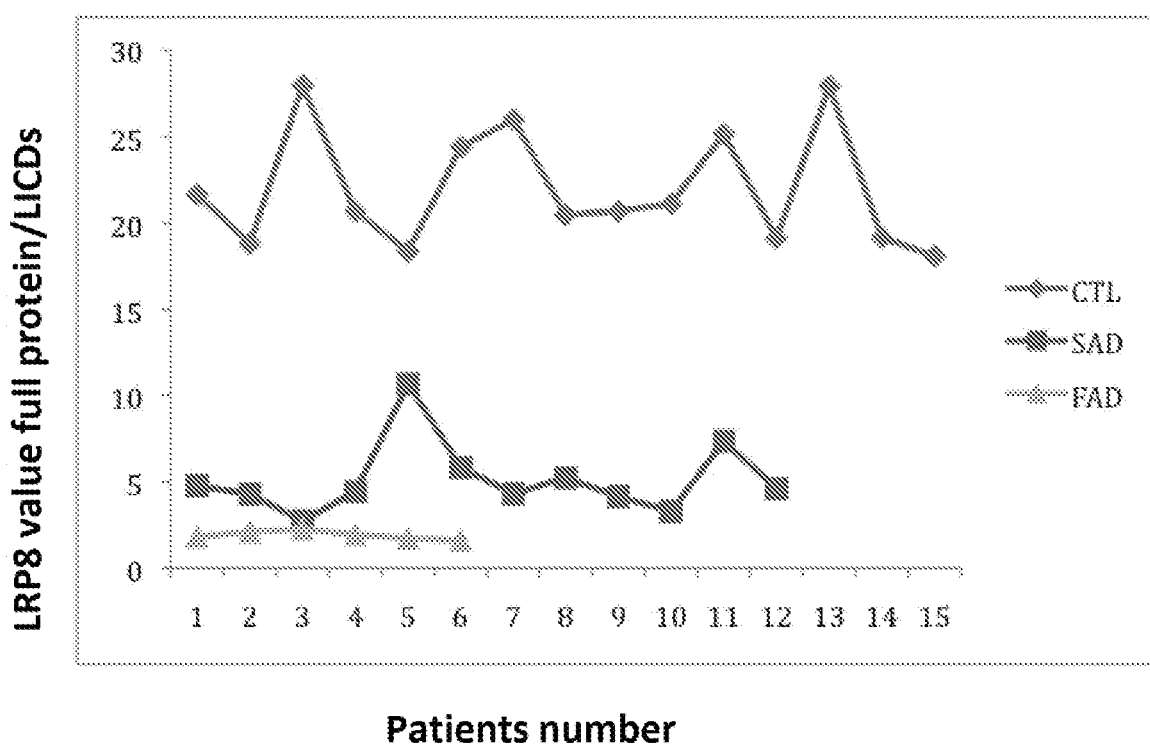
FIG. 6 represents a graph of the comparison between the LRP8/LICDs ratio in control samples, SAD and FAD after ELISA testing.

Superposable results were also obtained using the ELISA Sandwich technique. In order to be able to specifically evaluate the presence of LICDs, the samples were prepared using centrifugal al concentrators (Centricon 30, Millipore, Cat. No. MRCF0R030) that have a molecular filter able to separate the proteins below 30 kDa, from those that have a higher weight, so as to be able to isolate the fraction that contains the LICDs (below 30 kDa) from that with the full-length receptor (fraction above 30 kDa). The multi-well plates with 96 wells were prepared with a substance that acts as a coating (0.1 M Na carbonate/bicarbonate-ratio 70:30) for 16 h in order to be able to immobilize the antibody (GS1 or GS2) on the wall of the multi-well plates with 96 wells. The following day the wells were washed with a solution containing PBS+0.05% Tween 20 and then a solution of PBS+10% of goat serum (NGS) was added for 3 h at ambient temperature to block the non-specific sites. The samples previously prepared (fractions above 30 kDa and fractions below 30 kDa) were added to the well, after the removal of the blocking solution, and incubated for 16 h at +4° C. Subsequently, 5 washes were performed with solution containing PBS+0.05% Tween 20 and the second anti-LRP8 antibody (antibody produced by 25F7F1 mouse hybridomas) was added which can bond to the antigens immobilized by the first antibody. The wells were washed again 5 times with the solution containing PBS+0.05% Tween 20 to remove the excess antibody and a secondary anti-mouse antibody conjugated with HRP was added (GE Healthcare, Cat. No. RPN4201 or analog). After incubation at 37° C. for 1 hour, the wells were washed five times as previously described and a solution of tetramethylbenzidine (TMB, Sigma), peroxidase substrate, was added. After leaving it to react for 10 minutes at ambient temperature, the reaction was stopped with a 1 M sulphuric acid solution and the absorbance readings were performed at 450 nm using a spectrophotometer with housing for multi-well plates (VICTOR 3, Perkin Elmer). In FIG. 6 it is possible to observe the results obtained from the ELISA experiments: as also observed in the WB experiments, with this other technique it is also possible to observe a reduction of the ratio between the full-length receptor (fraction above 30 kDa) and LICD (fraction below 30 kDa) in patients with sporadic and familial AD with respect to the control group. In fact, FIG. 6 shows a graph related to the ratio between the full-length receptor and LICDs (fractions reported above) of the values obtained through ELISA technique, for each of the samples belonging to the three analysed groups: non-AD controls (CTL), SAD and FAD. Also from this analysis it is possible to see how the trend of the values of the ratio between the full-length receptor and LICDs is significantly higher in the controls than in subjects with AD (SAD and FAD). Alternatively, with this technique it is however possible, for diagnostic purposes, to compare only the data related to LICDs or to the full-length protein (LRP8-FL) that can be obtained from the samples with the diagnostic bias, with respect to the levels thereof obtained from reference samples not affected by dementia or with respect to a calibration curve.

Figure 7:
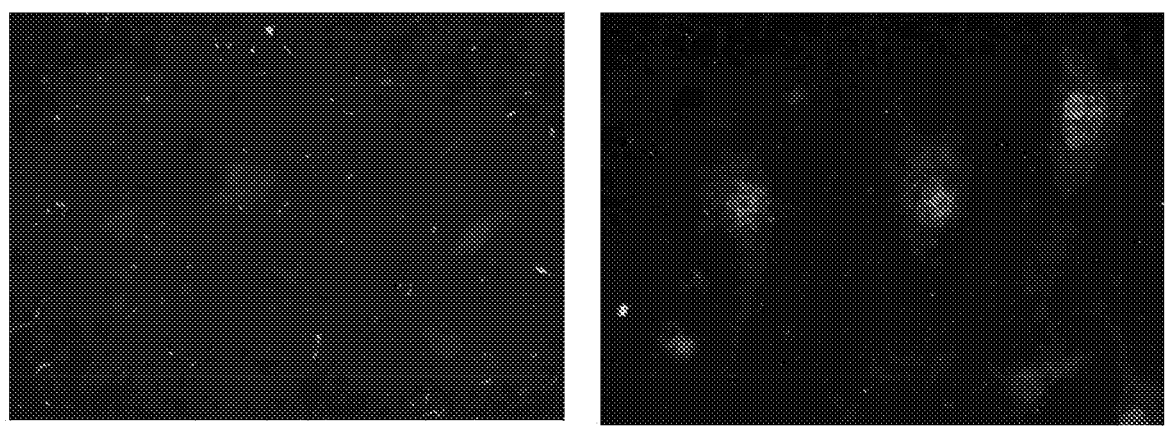
FIG. 7 shows two photographs of the result of two immunofluorescence assays using antibodies according to the present invention on histological samples of subjects affected by AD and not affected by AD.

Immunoistochemical analyses have also confirmed the aforesaid results. In fact, it was observed that on the same samples as above there is an intense and widespread colouring (image on the left in FIG. 7) in the parenchymal portion of the AD samples due to the presence of antibodies against SEQ. I.D. 5 marked with the specific fluorescent secondary antibody which, after its bond with the primary antibody, is excited at the wavelength of 578 nm and emits at 603 nm in the red range (Alexa Fluor 568 by the company Thermo Fisher or analogs). On the contrary, in the control samples neuronal and intracellular colouring is observed (image on the right in FIG. 7).

Analysis in Plasma and in Cerebrospinal Fluid (CSF)

Figure 8:
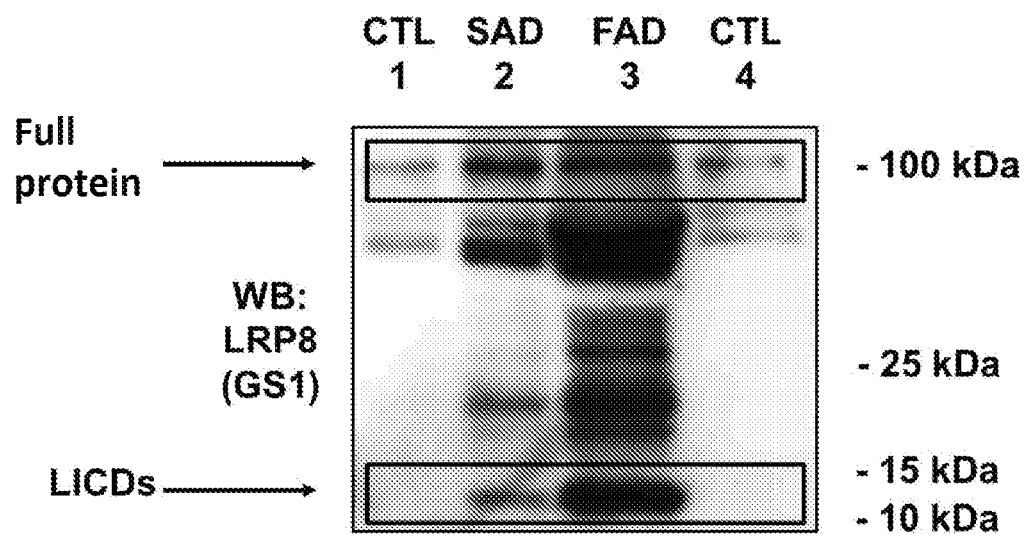
FIGS. 8 and 9 show the results of two Western blotting analyses that highlight the presence of LICDs fragments of LRP8 both in cerebrospinal fluid (FIG. 8) and in plasma (FIG. 9)
Figure 9:
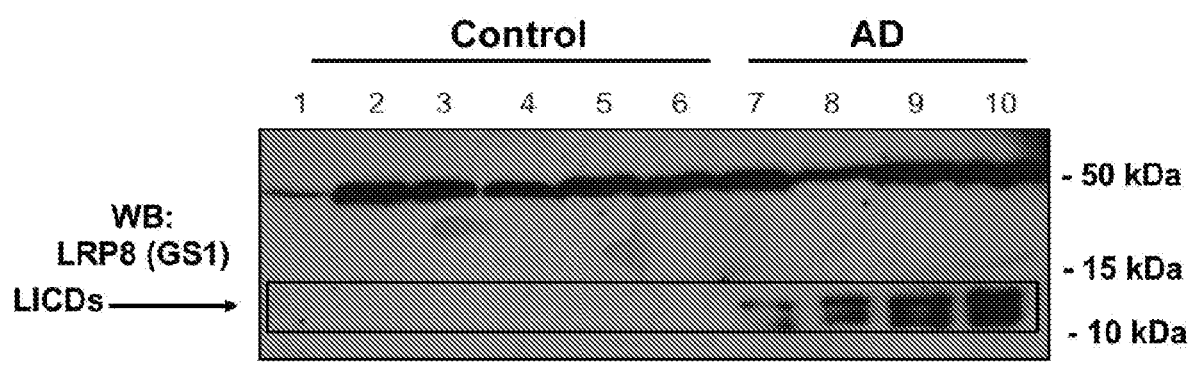

In parallel to the aforesaid investigations, samples of plasma and cerebrospinal fluid of AD and non-AD subjects were processed in order to identify and quantify the presence of LRP8 and LICDs as a peripheral marker. Samples of MCI (Mild Cognitive Impairment) subjects were also evaluated in which according to some scholars AD could be found in its earliest stage. This detection was also performed through SDS-PAGE technique followed by Western Blotting (FIG. 8) after placing the antibody GS1 in contact in samples of CSF coming from the cerebral ventricles (taken post-mortem) of control subjects (lines 1 and 4 of FIG. 8), of a subject with SAD (Line 2) and a familial case (Line 3, FAD) with a mutation in the PSEN1 gene. The procedure is identical to the one described in paragraph 0056. As can be noted from the result of the analysis through Western Blotting of FIG. 8, the LICDs fragments are only present in AD cases, with respect to non-AD cases, while the full-length protein is present in all subjects, as indicated by the boxes. Likewise, in human plasma samples, a significant increase in LICDs has been detected in AD cases (Lines 7-10 of the Western Blotting of FIG. 9) with respect to the controls (Lines 1-6 of FIG. 9).

The data obtained from the aforesaid analyses performed both on human brain tissues and CSF and plasma, suggest that an increase in LICDs represents a valid indicator or diagnostic marker for the identification of AD also in the early stages.

Additionally, alternatively or in parallel to what is described above, some techniques can also make use of the assessment of the reduction of LRP8 FL (see 0059); in fact also the simultaneous reduction of the quantity of the full-length protein LRP8 would confirm the presence of AD and early onset AD.

Comparative Example

Figure 10:
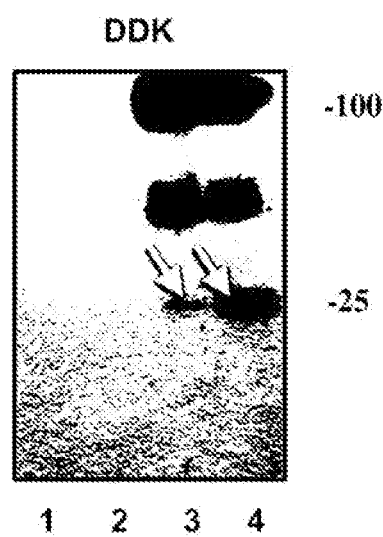
FIG. 10 represents the result of a Western blotting analysis of DDK antibody against tagged LRP8.

For comparative purposes only, a murine cell line (N2A) stably transfected with a plasmid expressing isoform 1 of the human protein LRP8 (Uniprot Q14114-1) was prepared, comprising a label or tag of the DDK-myc type bonded to its C-terminal end. The murine monoclonal antibody anti-DDK (Origene, clone OTI4C5) against such tag showed the result of FIG. 10 which represents the SDS-PAGE technique followed by Western Blotting performed under the same conditions previously described. In particular, it is clear that also this type of antibody is able to bond only to sequences of no less than 25 kDa (lines 3-4). Lines 1-2 indicate two negative controls, i.e. two samples of N2A cells not expressing LRP8-DDK-myc.

The invention claimed is:

1. A method for detecting and quantifying LRP8 and its C-terminal fragments in a human biological sample, comprising contacting the sample isolated from the human body with a monoclonal and/or polyclonal antibody that specifically binds to at least a specific amino acid sequence of a C-terminal region of LRP8, the antibody comprising:

(a) a heavy chain CDR1 amino acid sequence according to SEQ ID NO: 29, a heavy chain CDR2 amino acid sequence according to SEQ ID NO: 31, a heavy chain CDR3 amino acid sequence according to SEQ ID NO: 33, a light chain CDR1 amino acid sequence according to SEQ ID NO: 45, a light chain CDR2 amino acid sequence according to SEQ ID NO: 47, a light chain CDR3 amino acid sequence according to SEQ ID NO: 49; or (b) a heavy chain CDR1 amino acid sequence according to SEQ ID NO: 61, a heavy chain CDR2 amino acid sequence according to SEQ ID NO: 63, a heavy chain CDR3 amino acid sequence according to SEQ ID NO:

65, a light chain CDR1 amino acid sequence according to SEQ ID NO: 77, a light chain CDR2 amino acid sequence according to SEQ ID NO: 79, a light chain CDR3 amino acid sequence according to SEQ ID NO: 81;

the amino acid sequence of the C-terminal region of LRP8 consisting of C-terminal amino acid residues 837-963 or a sequence within said residues 837-963 selected from the group consisting of amino acid residues 837-857, 850-864, 863-878, 874-887, 882-898, 898-917, 915-940, and 940-963.

2. The method according to claim 1, wherein the amino acid sequence of the C-terminal region of LRP8 is, respectively:

IALLCMSGYLIWRNWKRKNTKSMNFDNPVYRKTTEEEDEDELHIGRTAQIGH VYPAAISSFDRPLWAEPCLGETREPEDPAPALKELFVLPGEPRSQLHQLPKNPLSELPV VKSKRVALSLEDDGLP (SEQ ID NO: 1) for amino acid residues 837-963, IALLCMSGYLIWRNWKRKNTK (SEQ ID NO: 2) for amino acid residues 837-857, NWKRKNTKSMNFDN (SEQ ID NO: 3) for amino acid residues 850-864, NPVYRKTTEEEDEDEL (SEQ ID NO: 4) for amino acid residues 863-878, DEDELHIGRTAQIG (SEQ ID NO: 5) for amino acid residues 874-887, RTAQIGHVYPAAISSFD (SEQ ID NO: 6) for amino acid residues 882-898, DRPLWAEPCLGETREPEDPA (SEQ ID NO: 7) for amino acid residues 898-917, DPAPALKELFVLPGEPRSQLHQLPKN (SEQ ID NO: 8) for amino acid residues 915-940, and NPLSELPVVKSKRVALSLEDDGLP (SEQ ID NO: 9) for amino acid residues 940-963.

3. The method according to claim 1, wherein LRP8 and its C-terminal fragments are detected and/or quantified by one or more process selected from the group consisting of:

ELISA, separation and detection by lateral flow, mono or bi-dimensional electrophoresis, Western Blotting, immunoprecipitation followed by any one of the preceding techniques,

RIA,

Electrophoresis,

HPLC,

FPLC, a chromatographic technique followed by a detecting technique,

Surface Plasmon Resonance (SPR), interferometry analysis, wherein the antibodies against the sequences are used either as capturing or interacting molecules, and mass spectroscopy after purification of the biological sample with HPLC or nano-HPLC chromatographic methodologies.

* * * * *

SEQUENCE LISTING

<160> NUMBER OF SEQ ID NOS: 82

<210> SEQ ID NO 1
<211> LENGTH: 127
<212> TYPE: PRT
<213> ORGANISM: Homo sapiens

<400> SEQUENCE: 1

Ile Ala Leu Leu Cys Met Ser Gly Tyr Leu Ile Trp Arg Asn Trp Lys
 1               5                  10                  15

Arg Lys Asn Thr Lys Ser Met Asn Phe Asp Asn Pro Val Tyr Arg Lys
             20                  25                  30

Thr Thr Glu Glu Glu Asp Glu Asp Glu Leu His Ile Gly Arg Thr Ala
         35                  40                  45

Gln Ile Gly His Val Tyr Pro Ala Ala Ile Ser Ser Phe Asp Arg Pro
     50                  55                  60

Leu Trp Ala Glu Pro Cys Leu Gly Glu Thr Arg Glu Pro Glu Asp Pro
 65                  70                  75                  80

Ala Pro Ala Leu Lys Glu Leu Phe Val Leu Pro Gly Glu Pro Arg Ser
                 85                  90                  95

Gln Leu His Gln Leu Pro Lys Asn Pro Leu Ser Glu Leu Pro Val Val
            100                 105                 110

Lys Ser Lys Arg Val Ala Leu Ser Leu Glu Asp Gly Leu Pro
            115                 120                 125

<210> SEQ ID NO 2
<211> LENGTH: 21
<212> TYPE: PRT
<213> ORGANISM: Homo sapiens

<400> SEQUENCE: 2

Ile Ala Leu Leu Cys Met Ser Gly Tyr Leu Ile Trp Arg Asn Trp Lys
 1               5                  10                  15

Arg Lys Asn Thr Lys
             20

<210> SEQ ID NO 3
<211> LENGTH: 15
<212> TYPE: PRT
<213> ORGANISM: Homo sapiens

<400> SEQUENCE: 3

Asn Trp Lys Arg Lys Asn Thr Lys Ser Met Asn Phe Asp Asn Pro
 1               5                  10                  15

<210> SEQ ID NO 4
<211> LENGTH: 16
<212> TYPE: PRT
<213> ORGANISM: Homo sapiens

<400> SEQUENCE: 4

Asn Pro Val Tyr Arg Lys Thr Thr Glu Glu Glu Asp Glu Asp Glu Leu
 1               5                  10                  15

<210> SEQ ID NO 5
<211> LENGTH: 14
<212> TYPE: PRT
<213> ORGANISM: Homo sapiens

<400> SEQUENCE: 5

Asp Glu Asp Glu Leu His Ile Gly Arg Thr Ala Gln Ile Gly

<210> SEQ ID NO 6
<211> LENGTH: 17
<212> TYPE: PRT
<213> ORGANISM: Homo sapiens

<400> SEQUENCE: 6

Arg Thr Ala Gln Ile Gly His Val Tyr Pro Ala Ala Ile Ser Ser Phe
1               5                   10                  15

Asp

<210> SEQ ID NO 7
<211> LENGTH: 20
<212> TYPE: PRT
<213> ORGANISM: Homo sapiens

<400> SEQUENCE: 7

Asp Arg Pro Leu Trp Ala Glu Pro Cys Leu Gly Glu Thr Arg Glu Pro
1               5                   10                  15

Glu Asp Pro Ala
            20

<210> SEQ ID NO 8
<211> LENGTH: 26
<212> TYPE: PRT
<213> ORGANISM: Homo sapiens

<400> SEQUENCE: 8

Asp Pro Ala Pro Ala Leu Lys Glu Leu Phe Val Leu Pro Gly Glu Pro
1               5                   10                  15

Arg Ser Gln Leu His Gln Leu Pro Lys Asn
            20                  25

<210> SEQ ID NO 9
<211> LENGTH: 24
<212> TYPE: PRT
<213> ORGANISM: Homo sapiens

<400> SEQUENCE: 9

Asn Pro Leu Ser Glu Leu Pro Val Val Lys Ser Lys Arg Val Ala Leu
1               5                   10                  15

Ser Leu Glu Asp Asp Gly Leu Pro
            20

<210> SEQ ID NO 10
<211> LENGTH: 21
<212> TYPE: PRT
<213> ORGANISM: Homo sapiens

<400> SEQUENCE: 10

Val Ile Gly Ile Ile Val Pro Ile Val Val Ile Ala Leu Leu Cys Met
1               5                   10                  15

Ser Gly Tyr Leu Ile
            20

<210> SEQ ID NO 11
<211> LENGTH: 4
<212> TYPE: PRT
<213> ORGANISM: Homo sapiens

<400> SEQUENCE: 11

Val Val Ile Ala
1

<210> SEQ ID NO 12
<211> LENGTH: 5
<212> TYPE: PRT
<213> ORGANISM: Homo sapiens

<400> SEQUENCE: 12

Asp Asn Pro Val Tyr
1               5

<210> SEQ ID NO 13
<211> LENGTH: 59
<212> TYPE: PRT
<213> ORGANISM: Homo sapiens

<400> SEQUENCE: 13

Ala Ile Ser Ser Phe Asp Arg Pro Leu Trp Ala Glu Pro Cys Leu Gly
1               5                   10                  15

Glu Thr Arg Glu Pro Glu Asp Pro Ala Pro Ala Leu Lys Glu Leu Phe
            20                  25                  30

Val Leu Pro Gly Glu Pro Arg Ser Gln Leu His Gln Leu Pro Lys Asn
        35                  40                  45

Pro Leu Ser Glu Leu Pro Val Val Lys Ser Lys
    50                  55

<210> SEQ ID NO 14
<211> LENGTH: 963
<212> TYPE: PRT
<213> ORGANISM: Homo sapiens

<400> SEQUENCE: 14

Met Gly Leu Pro Glu Pro Gly Pro Leu Arg Leu Leu Ala Leu Leu Leu
1               5                   10                  15

Leu Leu Leu Leu Leu Leu Leu Gln Leu Gln His Leu Ala Ala Ala
            20                  25                  30

Ala Ala Asp Pro Leu Leu Gly Gly Gln Gly Pro Ala Lys Asp Cys Glu
        35                  40                  45

Lys Asp Gln Phe Gln Cys Arg Asn Glu Arg Cys Ile Pro Ser Val Trp
    50                  55                  60

Arg Cys Asp Glu Asp Asp Asp Cys Leu Asp His Ser Asp Glu Asp Asp
65                  70                  75                  80

Cys Pro Lys Lys Thr Cys Ala Asp Ser Asp Phe Thr Cys Asp Asn Gly
                85                  90                  95

His Cys Ile His Glu Arg Trp Lys Cys Asp Gly Glu Glu Cys Pro
            100                 105                 110

Asp Gly Ser Asp Glu Ser Glu Ala Thr Cys Thr Lys Gln Val Cys Pro
        115                 120                 125

Ala Glu Lys Leu Ser Cys Gly Pro Thr Ser His Lys Cys Val Pro Ala
    130                 135                 140

Ser Trp Arg Cys Asp Gly Glu Lys Asp Cys Glu Gly Gly Ala Asp Glu
145                 150                 155                 160

Ala Gly Cys Ala Thr Leu Cys Ala Pro His Glu Phe Gln Cys Gly Asn
                165                 170                 175

Arg Ser Cys Leu Ala Ala Val Phe Val Cys Asp Gly Asp Asp Cys
            180                 185                 190

Gly Asp Gly Ser Asp Glu Arg Gly Cys Ala Asp Pro Ala Cys Gly Pro

-continued

```
              195                 200                 205
Arg Glu Phe Arg Cys Gly Gly Asp Gly Gly Ala Cys Ile Pro Glu
210                 215                 220
Arg Trp Val Cys Asp Arg Gln Phe Asp Cys Glu Asp Arg Ser Asp Glu
225                 230                 235                 240
Ala Ala Glu Leu Cys Gly Arg Pro Gly Pro Gly Ala Thr Ser Ala Pro
                245                 250                 255
Ala Ala Cys Ala Thr Ala Ser Gln Phe Ala Cys Arg Ser Gly Glu Cys
            260                 265                 270
Val His Leu Gly Trp Arg Cys Asp Gly Asp Arg Asp Cys Lys Asp Lys
                275                 280                 285
Ser Asp Glu Ala Asp Cys Pro Leu Gly Thr Cys Arg Gly Asp Glu Phe
290                 295                 300
Gln Cys Gly Asp Gly Thr Cys Val Leu Ala Ile Lys His Cys Asn Gln
305                 310                 315                 320
Glu Gln Asp Cys Pro Asp Gly Ser Asp Glu Ala Gly Cys Leu Gln Gly
                325                 330                 335
Leu Asn Glu Cys Leu His Asn Asn Gly Gly Cys Ser His Ile Cys Thr
            340                 345                 350
Asp Leu Lys Ile Gly Phe Glu Cys Thr Cys Pro Ala Gly Phe Gln Leu
                355                 360                 365
Leu Asp Gln Lys Thr Cys Gly Asp Ile Asp Glu Cys Lys Asp Pro Asp
370                 375                 380
Ala Cys Ser Gln Ile Cys Val Asn Tyr Lys Gly Tyr Phe Lys Cys Glu
385                 390                 395                 400
Cys Tyr Pro Gly Tyr Glu Met Asp Leu Leu Thr Lys Asn Cys Lys Ala
                405                 410                 415
Ala Ala Gly Lys Ser Pro Ser Leu Ile Phe Thr Asn Arg His Glu Val
            420                 425                 430
Arg Arg Ile Asp Leu Val Lys Arg Asn Tyr Ser Arg Leu Ile Pro Met
                435                 440                 445
Leu Lys Asn Val Val Ala Leu Asp Val Glu Val Ala Thr Asn Arg Ile
            450                 455                 460
Tyr Trp Cys Asp Leu Ser Tyr Arg Lys Ile Tyr Ser Ala Tyr Met Asp
465                 470                 475                 480
Lys Ala Ser Asp Pro Lys Glu Gln Glu Val Leu Ile Asp Glu Gln Leu
                485                 490                 495
His Ser Pro Glu Gly Leu Ala Val Asp Trp Val His Lys His Ile Tyr
            500                 505                 510
Trp Thr Asp Ser Gly Asn Lys Thr Ile Ser Val Ala Thr Val Asp Gly
            515                 520                 525
Gly Arg Arg Thr Leu Phe Ser Arg Asn Leu Ser Glu Pro Arg Ala
530                 535                 540
Ile Ala Val Asp Pro Leu Arg Gly Phe Met Tyr Trp Ser Asp Trp Gly
545                 550                 555                 560
Asp Gln Ala Lys Ile Glu Lys Ser Gly Leu Asn Gly Val Asp Arg Gln
                565                 570                 575
Thr Leu Val Ser Asp Asn Ile Glu Trp Pro Asn Gly Ile Thr Leu Asp
            580                 585                 590
Leu Leu Ser Gln Arg Leu Tyr Trp Val Asp Ser Lys Leu His Gln Leu
                595                 600                 605
Ser Ser Ile Asp Phe Ser Gly Gly Asn Arg Lys Thr Leu Ile Ser Ser
            610                 615                 620
```

Thr Asp Phe Leu Ser His Pro Phe Gly Ile Ala Val Phe Glu Asp Lys
625                 630                 635                 640

Val Phe Trp Thr Asp Leu Glu Asn Glu Ala Ile Phe Ser Ala Asn Arg
                645                 650                 655

Leu Asn Gly Leu Glu Ile Ser Ile Leu Ala Glu Asn Leu Asn Asn Pro
            660                 665                 670

His Asp Ile Val Ile Phe His Glu Leu Lys Gln Pro Arg Ala Pro Asp
        675                 680                 685

Ala Cys Glu Leu Ser Val Gln Pro Asn Gly Gly Cys Glu Tyr Leu Cys
690                 695                 700

Leu Pro Ala Pro Gln Ile Ser Ser His Ser Pro Lys Tyr Thr Cys Ala
705                 710                 715                 720

Cys Pro Asp Thr Met Trp Leu Gly Pro Asp Met Lys Arg Cys Tyr Arg
                725                 730                 735

Ala Pro Gln Ser Thr Ser Thr Thr Leu Ala Ser Thr Met Thr Arg
            740                 745                 750

Thr Val Pro Ala Thr Thr Arg Ala Pro Gly Thr Thr Val His Arg Ser
        755                 760                 765

Thr Tyr Gln Asn His Ser Thr Glu Thr Pro Ser Leu Thr Ala Ala Val
770                 775                 780

Pro Ser Ser Val Ser Val Pro Arg Ala Pro Ser Ile Ser Pro Ser Thr
785                 790                 795                 800

Leu Ser Pro Ala Thr Ser Asn His Ser Gln His Tyr Ala Asn Glu Asp
                805                 810                 815

Ser Lys Met Gly Ser Thr Val Thr Ala Ala Val Ile Gly Ile Ile Val
            820                 825                 830

Pro Ile Val Val Ile Ala Leu Leu Cys Met Ser Gly Tyr Leu Ile Trp
        835                 840                 845

Arg Asn Trp Lys Arg Lys Asn Thr Lys Ser Met Asn Phe Asp Asn Pro
850                 855                 860

Val Tyr Arg Lys Thr Thr Glu Glu Glu Asp Glu Asp Glu Leu His Ile
865                 870                 875                 880

Gly Arg Thr Ala Gln Ile Gly His Val Tyr Pro Ala Ala Ile Ser Ser
                885                 890                 895

Phe Asp Arg Pro Leu Trp Ala Glu Pro Cys Leu Gly Glu Thr Arg Glu
            900                 905                 910

Pro Glu Asp Pro Ala Pro Ala Leu Lys Glu Leu Phe Val Leu Pro Gly
        915                 920                 925

Glu Pro Arg Ser Gln Leu His Gln Leu Pro Lys Asn Pro Leu Ser Glu
930                 935                 940

Leu Pro Val Val Lys Ser Lys Arg Val Ala Leu Ser Leu Glu Asp Asp
945                 950                 955                 960

Gly Leu Pro

<210> SEQ ID NO 15
<211> LENGTH: 183
<212> TYPE: PRT
<213> ORGANISM: Homo sapiens

<400> SEQUENCE: 15

Thr Ala Ala Val Pro Ser Ser Val Ser Val Pro Arg Ala Pro Ser Ile
1               5                   10                  15

Ser Pro Ser Thr Leu Ser Pro Ala Thr Ser Asn His Ser Gln His Tyr
                20                  25                  30

-continued

```
Ala Asn Glu Asp Ser Lys Met Gly Ser Thr Val Thr Ala Ala Val Ile
            35                  40                  45

Gly Ile Ile Val Pro Ile Val Val Ile Ala Leu Leu Cys Met Ser Gly
        50                  55                  60

Tyr Leu Ile Trp Arg Asn Trp Lys Arg Lys Asn Thr Lys Ser Met Asn
65                  70                  75                  80

Phe Asp Asn Pro Val Tyr Arg Lys Thr Thr Glu Glu Glu Asp Glu Asp
                85                  90                  95

Glu Leu His Ile Gly Arg Thr Ala Gln Ile Gly His Val Tyr Pro Ala
            100                 105                 110

Ala Ile Ser Ser Phe Asp Arg Pro Leu Trp Ala Glu Pro Cys Leu Gly
        115                 120                 125

Glu Thr Arg Glu Pro Glu Asp Pro Ala Pro Ala Leu Lys Glu Leu Phe
    130                 135                 140

Val Leu Pro Gly Glu Pro Arg Ser Gln Leu His Gln Leu Pro Lys Asn
145                 150                 155                 160

Pro Leu Ser Glu Leu Pro Val Val Lys Ser Lys Arg Val Ala Leu Ser
                165                 170                 175

Leu Glu Asp Asp Gly Leu Pro
            180

<210> SEQ ID NO 16
<211> LENGTH: 91
<212> TYPE: PRT
<213> ORGANISM: Homo sapiens

<400> SEQUENCE: 16

Asn Glu Asp Ser Lys Met Gly Ser Thr Val Thr Ala Ala Val Ile Gly
1               5                   10                  15

Ile Ile Val Pro Ile Val Val Ile Ala Leu Leu Cys Met Ser Gly Tyr
            20                  25                  30

Leu Ile Trp Arg Asn Trp Lys Arg Lys Asn Thr Lys Ser Met Asn Phe
        35                  40                  45

Asp Asn Pro Val Tyr Arg Lys Thr Thr Glu Glu Glu Asp Glu Asp Glu
    50                  55                  60

Leu His Ile Gly Arg Thr Ala Gln Ile Gly His Val Tyr Pro Ala Arg
65                  70                  75                  80

Val Ala Leu Ser Leu Glu Asp Asp Gly Leu Pro
                85                  90

<210> SEQ ID NO 17
<211> LENGTH: 124
<212> TYPE: PRT
<213> ORGANISM: Homo sapiens

<400> SEQUENCE: 17

Thr Ala Ala Val Pro Ser Ser Val Ser Val Pro Arg Ala Pro Ser Ile
1               5                   10                  15

Ser Pro Ser Thr Leu Ser Pro Ala Thr Ser Asn His Ser Gln His Tyr
            20                  25                  30

Ala Asn Glu Asp Ser Lys Met Gly Ser Thr Val Thr Ala Ala Val Ile
        35                  40                  45

Gly Ile Ile Val Pro Ile Val Val Ile Ala Leu Leu Cys Met Ser Gly
    50                  55                  60

Tyr Leu Ile Trp Arg Asn Trp Lys Arg Lys Asn Thr Lys Ser Met Asn
65                  70                  75                  80
```

Phe Asp Asn Pro Val Tyr Arg Lys Thr Thr Glu Glu Asp Glu Asp
                85                  90                  95

Glu Leu His Ile Gly Arg Thr Ala Gln Ile Gly His Val Tyr Pro Ala
            100                 105                 110

Arg Val Ala Leu Ser Leu Glu Asp Asp Gly Leu Pro
        115                 120

<210> SEQ ID NO 18
<211> LENGTH: 183
<212> TYPE: PRT
<213> ORGANISM: Homo sapiens

<400> SEQUENCE: 18

Thr Ala Ala Val Pro Ser Ser Val Ser Val Pro Arg Ala Pro Ser Ile
1               5                   10                  15

Ser Pro Ser Thr Leu Ser Pro Ala Thr Ser Asn His Ser Gln His Tyr
            20                  25                  30

Ala Asn Glu Asp Ser Lys Met Gly Ser Thr Val Thr Ala Ala Val Ile
        35                  40                  45

Gly Ile Ile Val Pro Ile Val Ile Ala Leu Leu Cys Met Ser Gly
    50                  55                  60

Tyr Leu Ile Trp Arg Asn Trp Lys Arg Lys Asn Thr Lys Ser Met Asn
65                  70                  75                  80

Phe Asp Asn Pro Val Tyr Arg Lys Thr Thr Glu Glu Asp Glu Asp
                85                  90                  95

Glu Leu His Ile Gly Arg Thr Ala Gln Ile Gly His Val Tyr Pro Ala
            100                 105                 110

Ala Ile Ser Ser Phe Asp Arg Pro Leu Trp Ala Glu Pro Cys Leu Gly
        115                 120                 125

Glu Thr Arg Glu Pro Glu Asp Pro Ala Pro Ala Leu Lys Glu Leu Phe
    130                 135                 140

Val Leu Pro Gly Glu Pro Arg Ser Gln Leu His Gln Leu Pro Lys Asn
145                 150                 155                 160

Pro Leu Ser Glu Leu Pro Val Val Lys Ser Lys Arg Val Ala Leu Ser
                165                 170                 175

Leu Glu Asp Asp Gly Leu Pro
            180

<210> SEQ ID NO 19
<211> LENGTH: 57
<212> TYPE: DNA
<213> ORGANISM: Homo sapiens

<400> SEQUENCE: 19
atgggatgga gctggatctt tctcttcctc ctgtcaggaa ctgcaggtgt ccactct      57

<210> SEQ ID NO 20
<211> LENGTH: 90
<212> TYPE: DNA
<213> ORGANISM: Homo sapiens

<400> SEQUENCE: 20
gaggtccagc tgcaacagtc tggacctgtg ctggtgaagc ctggggcttc agtgaagatg   60
tcctgtaagg cttctggata caaattcact                                    90

<210> SEQ ID NO 21
<211> LENGTH: 15

<210> SEQ ID NO 21
<211> LENGTH: 15
<212> TYPE: DNA
<213> ORGANISM: Homo sapiens

<400> SEQUENCE: 21 gactactttta tgaac                                                         15

<210> SEQ ID NO 22
<211> LENGTH: 42
<212> TYPE: DNA
<213> ORGANISM: Homo sapiens

<400> SEQUENCE: 22
tgggtgaaga agagccatgg aaagagcctt gagtggattg ga                            42

<210> SEQ ID NO 23
<211> LENGTH: 51
<212> TYPE: DNA
<213> ORGANISM: Homo sapiens

<400> SEQUENCE: 23
gttattaatc cttacaacgg tggtactaga tacaaccaga agttcaaggg c                  51

<210> SEQ ID NO 24
<211> LENGTH: 96
<212> TYPE: DNA
<213> ORGANISM: Homo sapiens

<400> SEQUENCE: 24
aaggccacat tgactgttga caagtcctcc agcacagcct acatggagct caacagcctg         60
acatttgagg actctgcagt ctattactgt gcaagg                                   96

<210> SEQ ID NO 25
<211> LENGTH: 30
<212> TYPE: DNA
<213> ORGANISM: Homo sapiens

<400> SEQUENCE: 25
gagacggtag accttgcctg gtttgttcac                                          30

<210> SEQ ID NO 26
<211> LENGTH: 33
<212> TYPE: DNA
<213> ORGANISM: Homo sapiens

<400> SEQUENCE: 26
tggggccaag ggactctggt cactgtctct gca                                      33

<210> SEQ ID NO 27
<211> LENGTH: 19
<212> TYPE: PRT
<213> ORGANISM: Homo sapiens

<400> SEQUENCE: 27

Met Gly Trp Ser Trp Ile Phe Leu Phe Leu Leu Ser Gly Thr Ala Gly
1               5                   10                  15

Val His Ser

<210> SEQ ID NO 28
<211> LENGTH: 30
<212> TYPE: PRT
<213> ORGANISM: Homo sapiens

<400> SEQUENCE: 28

```
Glu Val Gln Leu Gln Gln Ser Gly Pro Val Leu Val Lys Pro Gly Ala
1               5                   10                  15

Ser Val Lys Met Ser Cys Lys Ala Ser Gly Tyr Lys Phe Thr
            20                  25                  30

<210> SEQ ID NO 29
<211> LENGTH: 5
<212> TYPE: PRT
<213> ORGANISM: Homo sapiens

<400> SEQUENCE: 29

Asp Tyr Phe Met Asn
1               5

<210> SEQ ID NO 30
<211> LENGTH: 14
<212> TYPE: PRT
<213> ORGANISM: Homo sapiens

<400> SEQUENCE: 30

Trp Val Lys Lys Ser His Gly Lys Ser Leu Glu Trp Ile Gly
1               5                   10

<210> SEQ ID NO 31
<211> LENGTH: 17
<212> TYPE: PRT
<213> ORGANISM: Homo sapiens

<400> SEQUENCE: 31

Val Ile Asn Pro Tyr Asn Gly Gly Thr Arg Tyr Asn Gln Lys Phe Lys
1               5                   10                  15

Gly

<210> SEQ ID NO 32
<211> LENGTH: 32
<212> TYPE: PRT
<213> ORGANISM: Homo sapiens

<400> SEQUENCE: 32

Lys Ala Thr Leu Thr Val Asp Lys Ser Ser Ser Thr Ala Tyr Met Glu
1               5                   10                  15

Leu Asn Ser Leu Thr Phe Glu Asp Ser Ala Val Tyr Tyr Cys Ala Arg
            20                  25                  30

<210> SEQ ID NO 33
<211> LENGTH: 10
<212> TYPE: PRT
<213> ORGANISM: Homo sapiens

<400> SEQUENCE: 33

Glu Thr Val Asp Leu Ala Trp Phe Val His
1               5                   10

<210> SEQ ID NO 34
<211> LENGTH: 11
<212> TYPE: PRT
<213> ORGANISM: Homo sapiens

<400> SEQUENCE: 34

Trp Gly Gln Gly Thr Leu Val Thr Val Ser Ala
1               5                   10
```

```
<210> SEQ ID NO 35
<211> LENGTH: 57
<212> TYPE: DNA
<213> ORGANISM: Homo sapiens

<400> SEQUENCE: 35
atgaagttgc ctgttaggct gttggtgctg atgttctgga ttcctgcttc cagcagt      57

<210> SEQ ID NO 36
<211> LENGTH: 69
<212> TYPE: DNA
<213> ORGANISM: Homo sapiens

<400> SEQUENCE: 36
gatgttttga tgacccaaac tccaccctcc ctgcctgtca ctcttggaga tcaggcctcc   60
atctcttgc                                                           69

<210> SEQ ID NO 37
<211> LENGTH: 48
<212> TYPE: DNA
<213> ORGANISM: Homo sapiens

<400> SEQUENCE: 37
agatctagtc agagtattgt atatagtaat ggaaacacct acttagaa                48

<210> SEQ ID NO 38
<211> LENGTH: 45
<212> TYPE: DNA
<213> ORGANISM: Homo sapiens

<400> SEQUENCE: 38
tggtacctgc agaagccagg ccagtctcca aagctcctga tctac                   45

<210> SEQ ID NO 39
<211> LENGTH: 21
<212> TYPE: DNA
<213> ORGANISM: Homo sapiens

<400> SEQUENCE: 39
aaagtttcca accgattttc t                                             21

<210> SEQ ID NO 40
<211> LENGTH: 96
<212> TYPE: DNA
<213> ORGANISM: Homo sapiens

<400> SEQUENCE: 40
ggggtcccag acaggttcag tggcagtgga tcaggacag atttcacact caagatcagc    60
agagtggagg ctgaggatct gggaatttat tactgc                             96

<210> SEQ ID NO 41
<211> LENGTH: 27
<212> TYPE: DNA
<213> ORGANISM: Homo sapiens

<400> SEQUENCE: 41
tttcaaggtt cacatgttcc gctcacg                                       27

<210> SEQ ID NO 42
<211> LENGTH: 30
<212> TYPE: DNA
<213> ORGANISM: Homo sapiens
```

<400> SEQUENCE: 42
ttcggtgctg ggaccaagct ggagctgaaa                                              30

<210> SEQ ID NO 43
<211> LENGTH: 19
<212> TYPE: PRT
<213> ORGANISM: Homo sapiens

<400> SEQUENCE: 43

Met Lys Leu Pro Val Arg Leu Leu Val Leu Met Phe Trp Ile Pro Ala
1               5                   10                  15

Ser Ser Ser

<210> SEQ ID NO 44
<211> LENGTH: 23
<212> TYPE: PRT
<213> ORGANISM: Homo sapiens

<400> SEQUENCE: 44

Asp Val Leu Met Thr Gln Thr Pro Pro Ser Leu Pro Val Thr Leu Gly
1               5                   10                  15

Asp Gln Ala Ser Ile Ser Cys
            20

<210> SEQ ID NO 45
<211> LENGTH: 16
<212> TYPE: PRT
<213> ORGANISM: Homo sapiens

<400> SEQUENCE: 45

Arg Ser Ser Gln Ser Ile Val Tyr Ser Asn Gly Asn Thr Tyr Leu Glu
1               5                   10                  15

<210> SEQ ID NO 46
<211> LENGTH: 15
<212> TYPE: PRT
<213> ORGANISM: Homo sapiens

<400> SEQUENCE: 46

Trp Tyr Leu Gln Lys Pro Gly Gln Ser Pro Lys Leu Leu Ile Tyr
1               5                   10                  15

<210> SEQ ID NO 47
<211> LENGTH: 7
<212> TYPE: PRT
<213> ORGANISM: Homo sapiens

<400> SEQUENCE: 47

Lys Val Ser Asn Arg Phe Ser
1               5

<210> SEQ ID NO 48
<211> LENGTH: 32
<212> TYPE: PRT
<213> ORGANISM: Homo sapiens

<400> SEQUENCE: 48

Gly Val Pro Asp Arg Phe Ser Gly Ser Gly Ser Gly Thr Asp Phe Thr
1               5                   10                  15

Leu Lys Ile Ser Arg Val Glu Ala Glu Asp Leu Gly Ile Tyr Tyr Cys
            20                  25                  30

```
<210> SEQ ID NO 49
<211> LENGTH: 9
<212> TYPE: PRT
<213> ORGANISM: Homo sapiens

<400> SEQUENCE: 49

Phe Gln Gly Ser His Val Pro Leu Thr
1               5

<210> SEQ ID NO 50
<211> LENGTH: 10
<212> TYPE: PRT
<213> ORGANISM: Homo sapiens

<400> SEQUENCE: 50

Phe Gly Ala Gly Thr Lys Leu Glu Leu Lys
1               5                   10

<210> SEQ ID NO 51
<211> LENGTH: 57
<212> TYPE: DNA
<213> ORGANISM: Homo sapiens

<400> SEQUENCE: 51
atgggatgga gctggatctt tctcttcctc ctgtcaggaa ctgcaggtgt ccactct        57

<210> SEQ ID NO 52
<211> LENGTH: 90
<212> TYPE: DNA
<213> ORGANISM: Homo sapiens

<400> SEQUENCE: 52
gaggtccagc tgcaacagtc tggacctgtg ctggtgaagc ctgggcttc agtgaagatg     60 tcctgtaagg cttctggata caaattcact                                     90

<210> SEQ ID NO 53
<211> LENGTH: 15
<212> TYPE: DNA
<213> ORGANISM: Homo sapiens

<400> SEQUENCE: 53
gaccacttta tgaac                                                     15

<210> SEQ ID NO 54
<211> LENGTH: 42
<212> TYPE: DNA
<213> ORGANISM: Homo sapiens

<400> SEQUENCE: 54
tgggtgaaga agaaccatgg aaagagcctt gagtggattg gg                       42

<210> SEQ ID NO 55
<211> LENGTH: 51
<212> TYPE: DNA
<213> ORGANISM: Homo sapiens

<400> SEQUENCE: 55
gttattaatc cttacaacgg tggtactagg ctcaacccga gtttaagggc                51

<210> SEQ ID NO 56
<211> LENGTH: 96
<212> TYPE: DNA
<213> ORGANISM: Homo sapiens
```

<400> SEQUENCE: 56
aaggccacat tgactgttga caagtcctcc agcacagtct acatggagct caacagcctg    60
acatttgagg actctgcagt ctattactgt gcaagg                              96

<210> SEQ ID NO 57
<211> LENGTH: 30
<212> TYPE: DNA
<213> ORGANISM: Homo sapiens

<400> SEQUENCE: 57
gagactatag accttgcctg gtttgcttat                                     30

<210> SEQ ID NO 58
<211> LENGTH: 33
<212> TYPE: DNA
<213> ORGANISM: Homo sapiens

<400> SEQUENCE: 58
tggggccagg ggactctggt cactgtctct gca                                 33

<210> SEQ ID NO 59
<211> LENGTH: 19
<212> TYPE: PRT
<213> ORGANISM: Homo sapiens

<400> SEQUENCE: 59

Met Gly Trp Ser Trp Ile Phe Leu Phe Leu Leu Ser Gly Thr Ala Gly
1               5                   10                  15

Val His Ser

<210> SEQ ID NO 60
<211> LENGTH: 30
<212> TYPE: PRT
<213> ORGANISM: Homo sapiens

<400> SEQUENCE: 60

Glu Val Gln Leu Gln Gln Ser Gly Pro Val Leu Val Lys Pro Gly Ala
1               5                   10                  15

Ser Val Lys Met Ser Cys Lys Ala Ser Gly Tyr Lys Phe Thr
            20                  25                  30

<210> SEQ ID NO 61
<211> LENGTH: 5
<212> TYPE: PRT
<213> ORGANISM: Homo sapiens

<400> SEQUENCE: 61

Asp His Phe Met Asn
1               5

<210> SEQ ID NO 62
<211> LENGTH: 14
<212> TYPE: PRT
<213> ORGANISM: Homo sapiens

<400> SEQUENCE: 62

Trp Val Lys Lys Asn His Gly Lys Ser Leu Glu Trp Ile Gly
1               5                   10

<210> SEQ ID NO 63
<211> LENGTH: 17
<212> TYPE: PRT

<213> ORGANISM: Homo sapiens

<400> SEQUENCE: 63

Val Ile Asn Pro Tyr Asn Gly Gly Thr Arg Leu Asn Pro Lys Phe Lys
1               5                   10                  15

Gly

<210> SEQ ID NO 64
<211> LENGTH: 32
<212> TYPE: PRT
<213> ORGANISM: Homo sapiens

<400> SEQUENCE: 64

Lys Ala Thr Leu Thr Val Asp Lys Ser Ser Thr Val Tyr Met Glu
1               5                   10                  15

Leu Asn Ser Leu Thr Phe Glu Asp Ser Ala Val Tyr Tyr Cys Ala Arg
            20                  25                  30

<210> SEQ ID NO 65
<211> LENGTH: 10
<212> TYPE: PRT
<213> ORGANISM: Homo sapiens

<400> SEQUENCE: 65

Glu Thr Ile Asp Leu Ala Trp Phe Ala Tyr
1               5                   10

<210> SEQ ID NO 66
<211> LENGTH: 11
<212> TYPE: PRT
<213> ORGANISM: Homo sapiens

<400> SEQUENCE: 66

Trp Gly Gln Gly Thr Leu Val Thr Val Ser Ala
1               5                   10

<210> SEQ ID NO 67
<211> LENGTH: 57
<212> TYPE: DNA
<213> ORGANISM: Homo sapiens

<400> SEQUENCE: 67
atgaagttgc ctgttaggct gttggtgctg atgttctgga ttcctgctac cagcagt    57

<210> SEQ ID NO 68
<211> LENGTH: 69
<212> TYPE: DNA
<213> ORGANISM: Homo sapiens

<400> SEQUENCE: 68
gatgttttga tgactcaaac tccaccctcc ctgcctgtca ctcttggaga tcaggcctcc    60
atctcttgc                                                           69

<210> SEQ ID NO 69
<211> LENGTH: 48
<212> TYPE: DNA
<213> ORGANISM: Homo sapiens

<400> SEQUENCE: 69
agatctagtc agagtattgt atatagtaat ggaaaaacct atttagaa    48

<210> SEQ ID NO 70

```
<211> LENGTH: 45
<212> TYPE: DNA
<213> ORGANISM: Homo sapiens

<400> SEQUENCE: 70
tggtacctgc agaagccagg ccagtctcca aagctcctga tgtac            45

<210> SEQ ID NO 71
<211> LENGTH: 21
<212> TYPE: DNA
<213> ORGANISM: Homo sapiens

<400> SEQUENCE: 71
aaagtttcca accgattttc t                                      21

<210> SEQ ID NO 72
<211> LENGTH: 96
<212> TYPE: DNA
<213> ORGANISM: Homo sapiens

<400> SEQUENCE: 72
ggggtcccag acaggttcag tggcagtgga tcagggacag atttcacact caagatcagc   60
agcgtggagg ctgaggatct gggaatttat tactgc                           96

<210> SEQ ID NO 73
<211> LENGTH: 27
<212> TYPE: DNA
<213> ORGANISM: Homo sapiens

<400> SEQUENCE: 73
tttcaaggtt cacatgttcc gctcacg                                27

<210> SEQ ID NO 74
<211> LENGTH: 30
<212> TYPE: DNA
<213> ORGANISM: Homo sapiens

<400> SEQUENCE: 74
ttcggtgctg ggaccaagct ggagctgaaa                             30

<210> SEQ ID NO 75
<211> LENGTH: 19
<212> TYPE: PRT
<213> ORGANISM: Homo sapiens

<400> SEQUENCE: 75

Met Lys Leu Pro Val Arg Leu Leu Val Leu Met Phe Trp Ile Pro Ala
1               5                   10                  15

Thr Ser Ser

<210> SEQ ID NO 76
<211> LENGTH: 23
<212> TYPE: PRT
<213> ORGANISM: Homo sapiens

<400> SEQUENCE: 76

Asp Val Leu Met Thr Gln Thr Pro Pro Ser Leu Pro Val Thr Leu Gly
1               5                   10                  15

Asp Gln Ala Ser Ile Ser Cys
            20

<210> SEQ ID NO 77
```

```
<211> LENGTH: 16
<212> TYPE: PRT
<213> ORGANISM: Homo sapiens

<400> SEQUENCE: 77

Arg Ser Ser Gln Ser Ile Val Tyr Ser Asn Gly Lys Thr Tyr Leu Glu
1               5                   10                  15

<210> SEQ ID NO 78
<211> LENGTH: 15
<212> TYPE: PRT
<213> ORGANISM: Homo sapiens

<400> SEQUENCE: 78

Trp Tyr Leu Gln Lys Pro Gly Gln Ser Pro Lys Leu Leu Met Tyr
1               5                   10                  15

<210> SEQ ID NO 79
<211> LENGTH: 7
<212> TYPE: PRT
<213> ORGANISM: Homo sapiens

<400> SEQUENCE: 79

Lys Val Ser Asn Arg Phe Ser
1               5

<210> SEQ ID NO 80
<211> LENGTH: 32
<212> TYPE: PRT
<213> ORGANISM: Homo sapiens

<400> SEQUENCE: 80

Gly Val Pro Asp Arg Phe Ser Gly Ser Gly Ser Gly Thr Asp Phe Thr
1               5                   10                  15

Leu Lys Ile Ser Ser Val Glu Ala Glu Asp Leu Gly Ile Tyr Tyr Cys
                20                  25                  30

<210> SEQ ID NO 81
<211> LENGTH: 9
<212> TYPE: PRT
<213> ORGANISM: Homo sapiens

<400> SEQUENCE: 81

Phe Gln Gly Ser His Val Pro Leu Thr
1               5

<210> SEQ ID NO 82
<211> LENGTH: 10
<212> TYPE: PRT
<213> ORGANISM: Homo sapiens

<400> SEQUENCE: 82

Phe Gly Ala Gly Thr Lys Leu Glu Leu Lys
1               5                   10
```